(12) United States Patent
Leahy et al.

(10) Patent No.: US 8,688,528 B2
(45) Date of Patent: Apr. 1, 2014

(54) METHODS AND SYSTEMS TO ALERT A USER OF A NETWORK-BASED MARKETPLACE EVENT

(75) Inventors: Scott Leahy, San Jose, CA (US); Carl Ferreira, San Jose, CA (US)

(73) Assignee: eBay, Inc., San Jose, CA (US)

( * ) Notice: Subject to any disclaimer, the term of this patent is extended or adjusted under 35 U.S.C. 154(b) by 1659 days.

(21) Appl. No.: 11/027,778

(22) Filed: Dec. 30, 2004

(65) Prior Publication Data
US 2006/0149655 A1    Jul. 6, 2006

(51) Int. Cl.
*G06Q 30/00* (2012.01)

(52) U.S. Cl.
USPC ........................................................ 705/26.1

(58) Field of Classification Search
USPC ................................. 705/26, 27, 14, 37, 26.1
See application file for complete search history.

(56) References Cited

U.S. PATENT DOCUMENTS

| | | | |
|---|---|---|---|
| 2002/0013763 A1 | 1/2002 | Harris | |
| 2002/0027567 A1 | 3/2002 | Niamir | |
| 2002/0147673 A1* | 10/2002 | Allen et al. | 705/37 |
| 2003/0069829 A1* | 4/2003 | Gathman et al. | 705/37 |
| 2004/0093302 A1* | 5/2004 | Baker et al. | 705/37 |
| 2005/0080712 A1* | 4/2005 | Bauer et al. | 705/37 |
| 2005/0177387 A1 | 8/2005 | Mojsa | |
| 2005/0289042 A1* | 12/2005 | Friesen | 705/37 |
| 2006/0277145 A1* | 12/2006 | Raccah et al. | 705/40 |
| 2008/0140557 A1 | 6/2008 | Bowlby et al. | |
| 2010/0121728 A1 | 5/2010 | Sun et al. | |

OTHER PUBLICATIONS

"U.S. Appl. No. 12/268,380 , Response filed May 21, 2013 to Non Final Office Action mailed Mar. 1, 2013", 19 pgs.
"U.S. Appl. No. 12/268,380 , Response filed Sep. 23, 2011 to Non Final Office Action mailed Jun. 23, 2011", 15 pgs.
"U.S. Appl. No. 12/268,380, Advisory Action mailed Oct. 18, 2012", 3 pgs.
"U.S. Appl. No. 12/268,380, Decision on Pre-Appeal Brief Request mailed Jan. 17, 2013", 2 pgs.
"U.S. Appl. No. 12/268,380, Final Office Action mailed Jul. 10, 2012", 18 pgs.
"U.S. Appl. No. 12/268,380, Non Final Office Action mailed Mar. 1, 2013", 18 pgs.
"U.S. Appl. No. 12/268,380, Non Final Office Action mailed Jun. 23, 2011", 18 pgs.
"U.S. Appl. No. 12/268,380, Non Final Office Action mailed Nov. 2, 2011", 17 pgs.
"U.S. Appl. No. 12/268,380, Pre-Appeal Brief Request for Reveiw filed Nov. 9, 2012", 4 pgs.
"U.S. Appl. No. 12/268,380, Response filed Feb. 2, 2012 to Non Final Office Action mailed Nov. 2, 2011", 13 pgs.
"U.S. Appl. No. 12/268,380, Response filed Sep. 10, 2012 to Final Office Action mailed Jul. 10, 2012", 17 pgs.

* cited by examiner

*Primary Examiner* — Mila Airapetian
(74) *Attorney, Agent, or Firm* — Schwegman Lundberg & Woessner, P.A.

(57) ABSTRACT

A system to alert a user of a network-based marketplace event. The system receives the network-based marketplace event and determines if the network-based marketplace event is associated with a network-based marketplace alert that has been requested by the user. If so, the system communicates the network-based marketplace alert to the client machine over a persistent connection, the network-based marketplace alert to alert the user of the network-based marketplace event.

45 Claims, 20 Drawing Sheets

NETWORK-BASED MARKETPLACE EVENTS
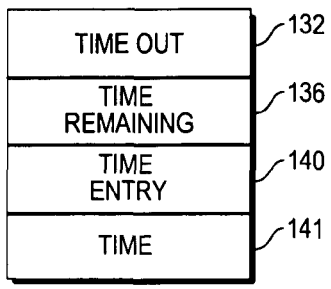
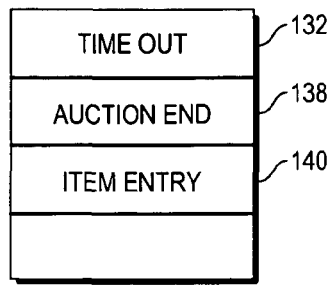
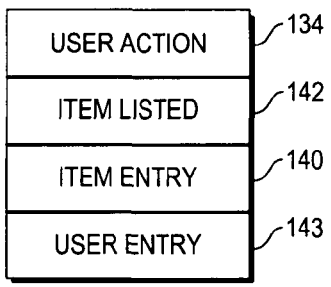
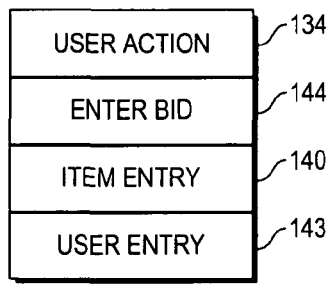
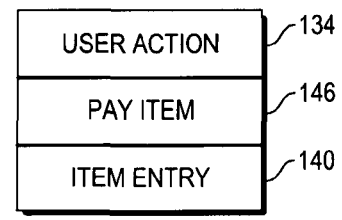
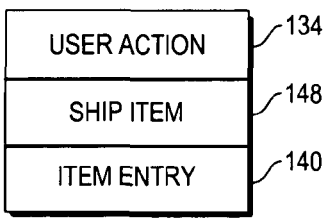
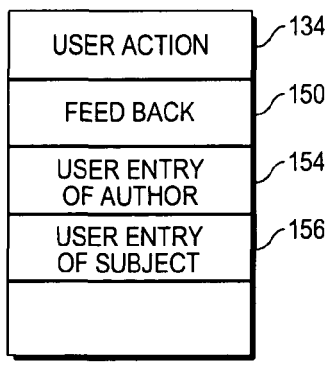
Fig. 5

METHODS AND SYSTEMS TO ALERT A USER OF A NETWORK-BASED MARKETPLACE EVENT

FIELD OF THE INVENTION

An embodiment relates generally to the technical field of electronic commerce, in one exemplary embodiment, to methods and systems to alert a user of a network-based marketplace event.

BACKGROUND OF THE INVENTION

Buyers and sellers that utilize network-based marketplaces often desire marketplace information that is not readily available due to technical problems that are inherent in networks. For example, a network-based marketplace may receive an event or a bid for an item that is being auctioned that may be of interest to another user (e.g., a bidder that has previously bid on the item); however, the network-based marketplace may be restrained from communicating the event to the bidder until the computer that is operated by the bidder (e.g., client machine) initiates communication with the network-based marketplace. In some instances, waiting is imposed by communication protocols that observe a client/server architecture that requires the client machine to initiate a communication. In other instances the protocol may be overridden but without effect due to a firewall at the client site that may prohibit the network-based marketplace computer (e.g., server machine) from initiating a communication.

SUMMARY OF THE INVENTION

According to a first aspect there is provided a method to alert a user at a client machine of a network-based marketplace event. The method includes receiving the network-based marketplace event and determining if the network-based marketplace event is associated with a network-based marketplace alert that has been requested by a user. If the network-based marketplace event is associated with a network-based marketplace alert that has been requested by a user then the network-based marketplace alert is communicated to the client machine over a persistent connection, the network-based marketplace alert to alert the user at the client machine of the network-based marketplace event.

According to a second aspect there is provided a method to alert a user at a client machine of a network-based marketplace event that is associated with auction information. The method includes receiving a request for a user interface that includes the auction information, the request automatically generated by a client application program at the client machine; and communicating the user interface to the client machine responsive to the automatically generated request, the user interface to include the auction information that is updated based on the network-based marketplace event.

BRIEF DESCRIPTION OF THE DRAWINGS

The present invention is illustrated by way of example and not limitation in the figures of the accompanying drawings, in which like references indicate similar elements and in which:

FIG. 5 is a block diagram illustrating network-based marketplace events, according to an embodiment;

FIELD OF THE INVENTION

The present invention relates generally to the technical field of commerce automation and, in one exemplary embodiment, to methods and systems to alert a user of a network-based marketplace event are described.

DETAILED DESCRIPTION

Methods and systems to alert a user of a network-based marketplace event are described. In the following description, for purposes of explanation, numerous specific details are set forth in order to provide a thorough understanding of the present invention. It will be evident, however, to one skilled in the art that the present invention may be practiced without these specific details.

According to one aspect there is provided a method to alert a user at a client machine of a network-based marketplace event. The method includes a server machine receiving a network-based marketplace event (e.g., a bid for an item in an auction, a notice that an auction has ended, the announced winner of an auction, etc.) and determining if the network-based marketplace event is associated with an alert that has been requested by a user at a client machine. If so, the server machine communicates the alert to the to the client machine over a persistent connection that has been established between the client machine and the server machine to facilitate the communication of alerts to the client machine.

According to a second aspect there is provided a method to alert a user at a client machine of a network-based marketplace event that is associated with auction information. The method includes a server machine that receives a request for a user interface that includes the auction information. The server responds by communicating the requested user interface to the client machine. The user interface may include auction information such as a countdown timer that indicates the amount of time remaining in the auction and the most recent bid for an item that is being auctioned. The user interface may further include a client application program that automatically requests the browser to request the user interface (e.g., a refresh) at a frequency (e.g., refresh time) that is based on the time remaining in the auction. For example, as the time remaining in the auction approaches the end of the auction, the client application program may request the user interface more frequently.

Platform Architecture

Figure 1:
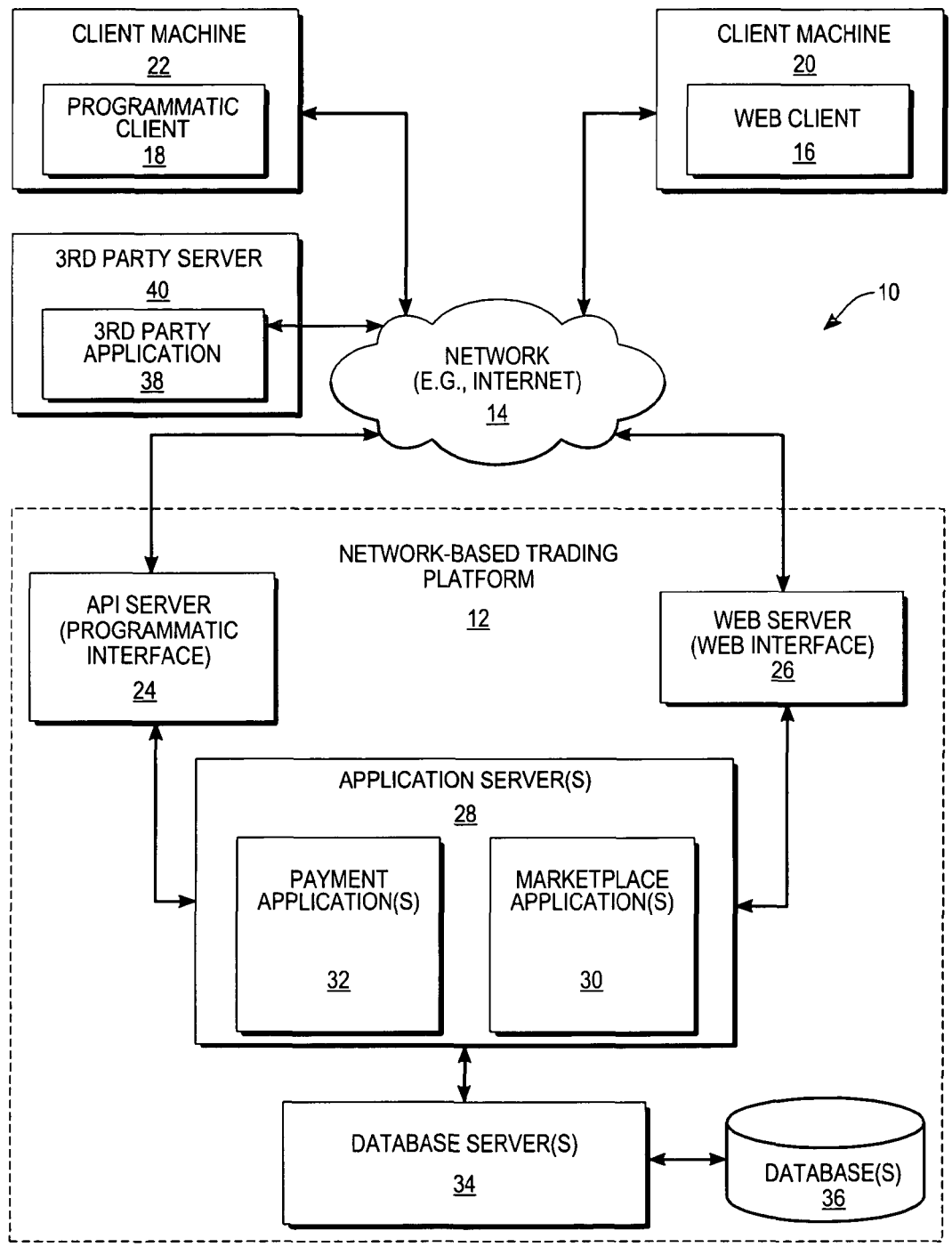
FIG. 1 is a network diagram depicting a system, according to one exemplary embodiment of the present invention.

FIG. 1 is a network diagram depicting a system 10, according to one exemplary embodiment of the present invention, having a client-server architecture. A commerce platform, in the exemplary form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers or server machines 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
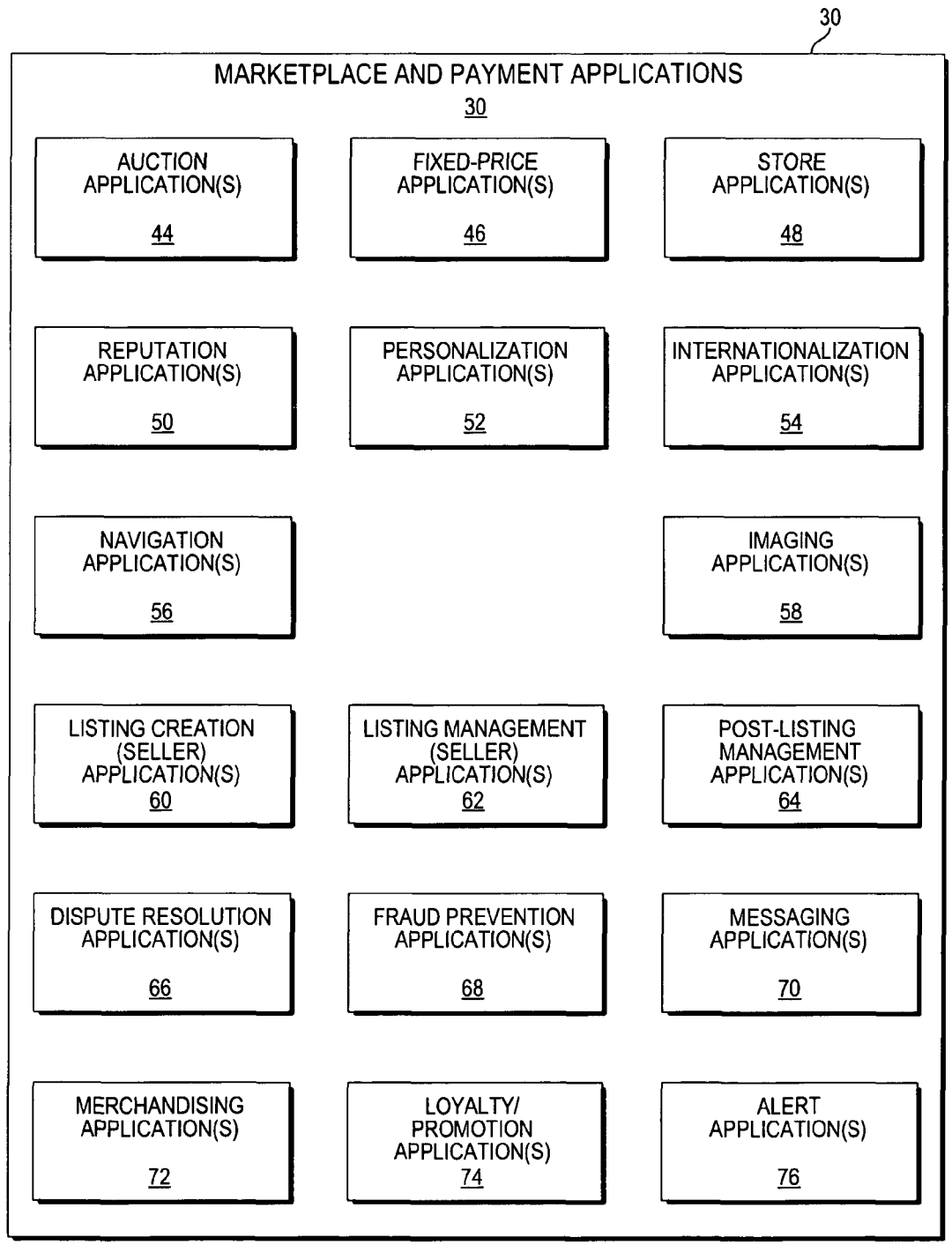
FIG. 2 is a block diagram depicting software components of the system, according to one exemplary embodiment of the present invention.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Alert applications 76 may be utilized to communicate alerts to users of the network-based marketplace in response to the network-based marketplace 12 receiving events. For instance, an auction for an item may be associated with a number of network-based marketplace events (e.g., bidding, out bidding, time remaining, winning, etc.) that may trigger the communication of an alert to an interested bidder or seller.

Data Structures

Figure 3:
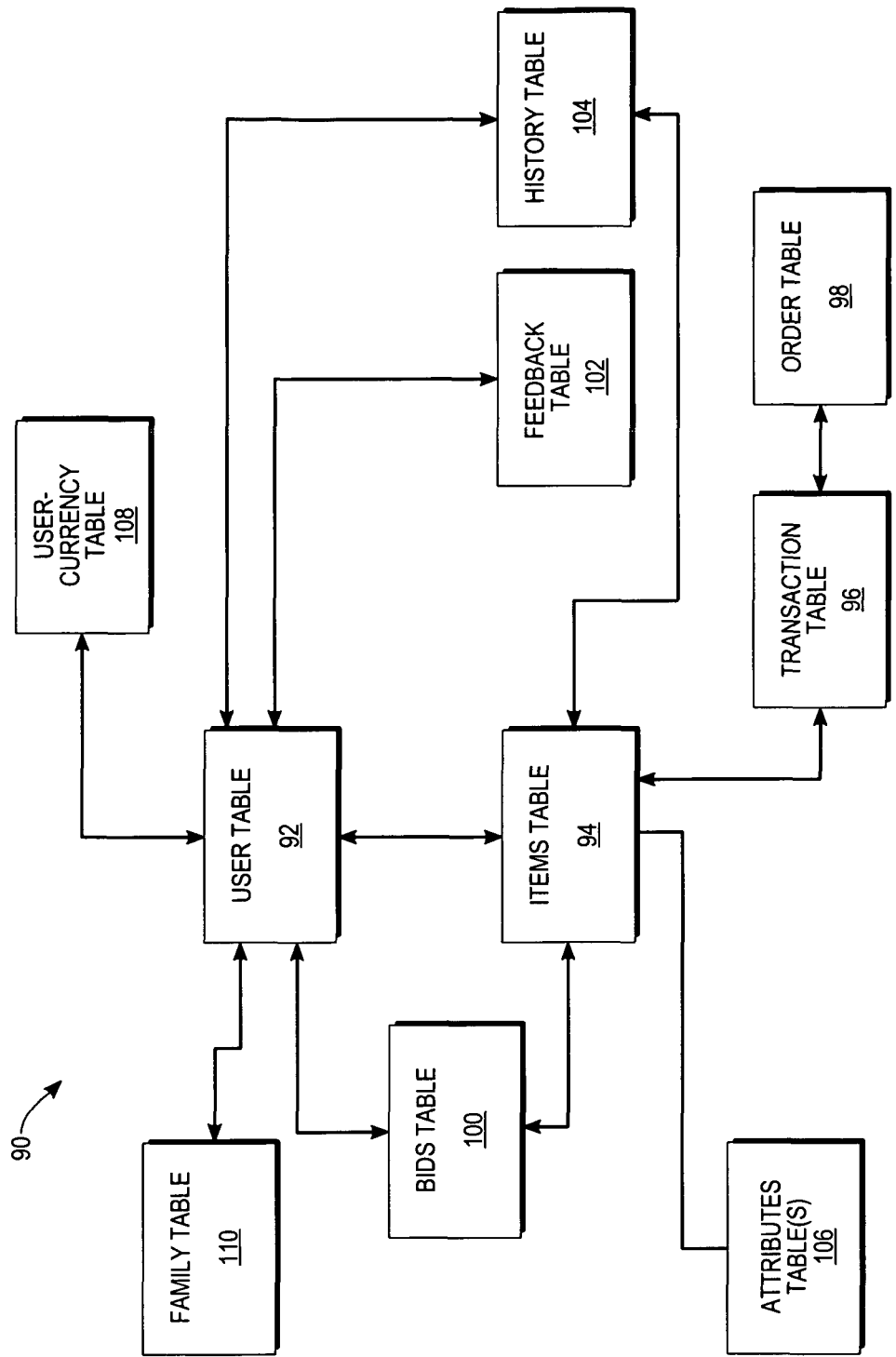
FIG. 3 is a block diagram illustrating databases, according to an embodiment.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 4:
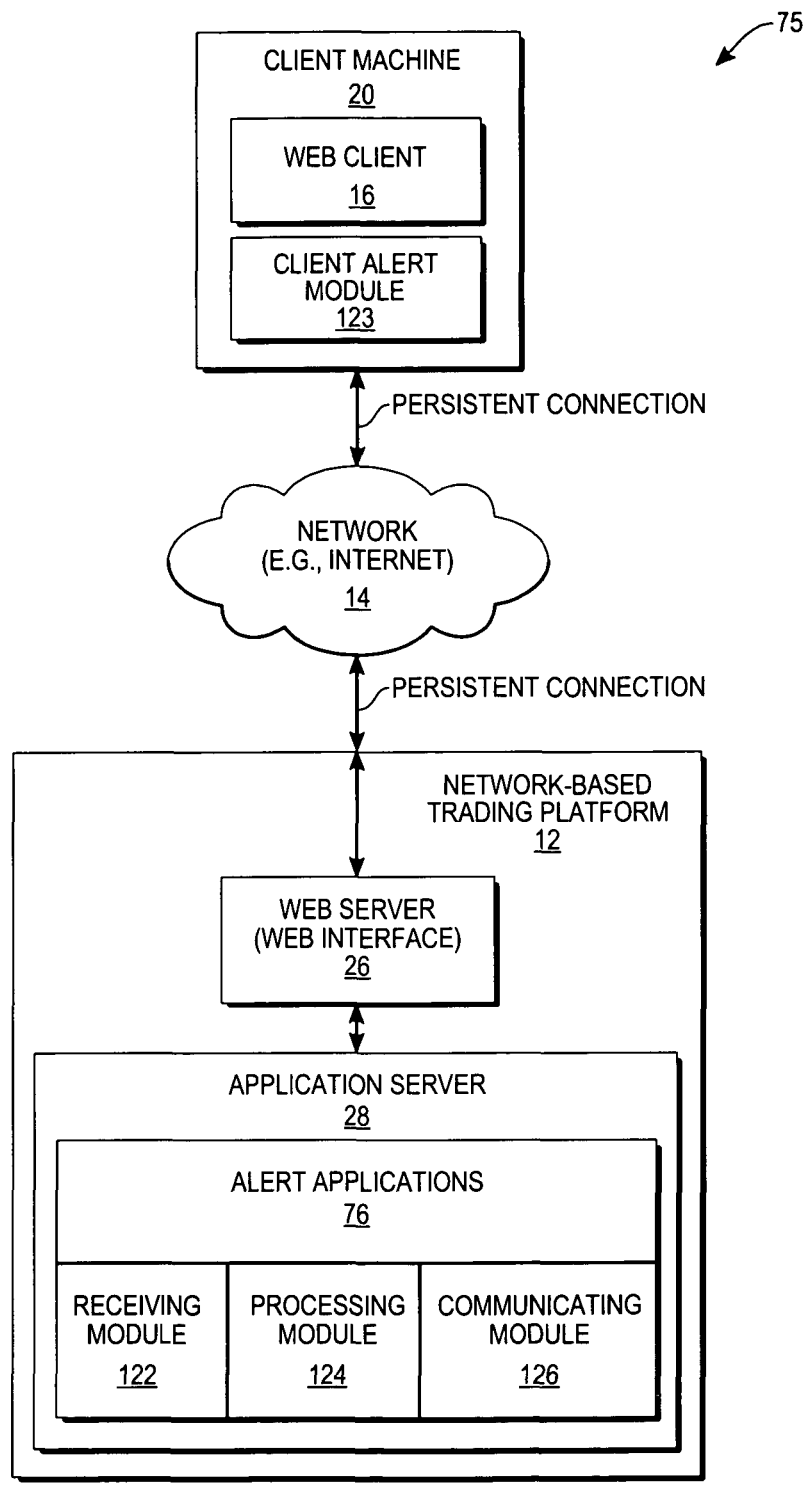
FIG. 4 is a network diagram depicting a system, according to an embodiment, to alert a user at a client machine of a network-based marketplace event.

FIG. 4 is a network diagram illustrating a system 75, according to one embodiment. The system 75 corresponds to the system 10 and, accordingly, the same or similar references have been used to indicate the same or similar features unless otherwise indicated. According to a first aspect as described above, the system 75 is broadly shown to alert a user at a client machine of a network-based marketplace event. To this end, the system 75 includes a client alert module 123 and alert applications 76.

The client alert module 123 executes under a background process on the client machine 20 and may be utilized by the user to configure and display an alert at the client machine 20. For example, the user may install software on the client machine 20 that includes the client alert module 123 that provides user interfaces to configure one or more alerts that the user may wish to receive at the client machine 20. Once an alert has been configured and a persistent HTTP connection has been established between the client machine 20 and the application server 28, the client alert module 123 may be utilized to receive and display alerts on the client machine 20. Thus, the alert applications 76, executing at the network-based marketplace 12, utilize the persistent HTTP connection to initiate or push or communicate an alert to the client machine 20.

The alert applications 76 include a receiving module 122, a processing module 124, and a communicating module 126. The receiving module 122 may receive network-based marketplace events in the form of user actions and/or timeouts that may be communicated to the receiving module 122 from various routines, objects, schedulers, etc. that are utilized to monitor and process network-based marketplace activity (e.g., transactions, bids, payment, shipment, time remaining in auctions, etc.). The processing module 124 may be utilized to determine if a particular network-based marketplace event is associated with one or more alerts that have been requested by one or more users. The communicating module 126 may be utilized to communicate the alert to a web client 16 at a client machine 20 over a persistent HTTP connection.

It will be appreciated that another embodiment of the above described system 75 may include the communicating module 126 communicating alerts via an API server 24 (e.g., over a persistent HTTP connection) to a programmatic client 18 at the client machine 22 (see FIG. 1). Yet another embodiment may include the communicating module 126 communicating alerts via the API server 24 or the web server 26 (e.g., over a persistent HTTP connection) to a third party application 38 at the third party server 40 (see FIG. 1).

FIG. 5 is a block diagram 128 illustrating network-based marketplace events 128, according to an embodiment. The network-based marketplace events 230 include timeout events 132 and user action events 134. The timeout events 132 include a time remaining event 136 that is communicated to the receiving module 122 at various times during the auction of an item or listing. For example, once an auction commences, the time remaining event 136 may be communicated to the receiving module 122 at thirty-second or five-second intervals. Another embodiment may communicate the time remaining event 136 to the receiving module 122 with increasing frequency as the end of the auction approaches. Yet another embodiment may communicate the time remaining event 136 in response to user configurable (e.g., seller or buyer) or system configurable periods of time before the end of the auction. The time remaining event 136 includes an item entry 140 that may be utilized to identify the item for auction and a time 141 to indicate the time remaining before the auction expires (e.g., closed for bidding). The timeout events 132 further include an auction end event 138 that is communicated to the receiving module 122 responsive to the expiration of an auction. The auction end event 138 also includes an item entry 140 that may be utilized to identify the item for which the auction has ended. The above embodiment exemplifies maintaining the timeout events 132 on the application sever 28 which may be advantageous to synchronize the time that is maintained by the client machines 22, 20 with the network-based marketplace 12; however, it will be appreciated that other embodiments may maintain timeout events 132 on the client machines 22, 20 which may be advantageous to minimize communication between the network-based marketplace 12 and the client machines 22, 20.

The diagram 128 further illustrates a number of user action events 134 that are communicated to the receiving module 122 in response to various user actions that are detected by the network-based marketplace 12. The user action events 134 include an item listed event 142, an enter bid event 144, a pay item event 146, a ship item event 148, and a feedback event 150. The item listed event 142 is communicated to the receiving module 122 in response to a seller listing an item on the network-based marketplace 12. The item listed event 142 includes an item entry 140 that may be utilized to identify the item in the item table 94. The enter bid event 144 is communicated to the receiving module 122 in response to a user submitting a bid to an auction. The enter bid event 144 includes an item entry 140 and a user entry 143. The user entry 143 may be utilized to identify the user that submitted the bid in the user table 92. The pay item event 146 is communicated to the receiving module 122 in response to the network-based marketplace 12 detecting a buyer that has provided payment for an item that has been won in an auction or purchased. In one embodiment the buyer may explicitly notify the network-based marketplace 12 by utilizing a user interface to indicate that payment has been made. In another embodiment the network-based marketplace 12 may automatically detect payment via a user action (e.g., receipt of payment) and yet in another embodiment the network-based marketplace 12 may indirectly detect payment by receiving communication from a third party service (e.g., payment service, promotion service, etc.). The pay item event 146 includes an item entry 140 that may be utilized to identify the item or listing. The ship item event 148 is communicated to the receiving module 122 in response to the network-based marketplace 12 detecting a seller that has shipped an item that has been won in an auction or purchased. In one embodiment the seller may explicitly notify the network-based marketplace 12 by utilizing a user interface to indicate that the item has been shipped. In another embodiment the network-based marketplace 12 may automatically detect shipment via a user action (e.g., receipt of command to ship) and yet in another embodiment the network-based marketplace 12 may indirectly detect payment by receiving communication from a third party service (e.g., shipping service, etc.).

The feedback event 150 is communicated to the receiving module 122 in response to the network-based marketplace 12 detecting feedback that has been authored by a user. Feedback may be authored by a buyer or seller and includes textual, numeric and categorical data that may characterize the performance of another buyer or seller that utilizes the network-based marketplace 12. The feedback event 150 may include a user entry 154 that corresponds to the author of the feedback and a user entry 156 that corresponds to the subject or target of the feedback.

Figure 6:
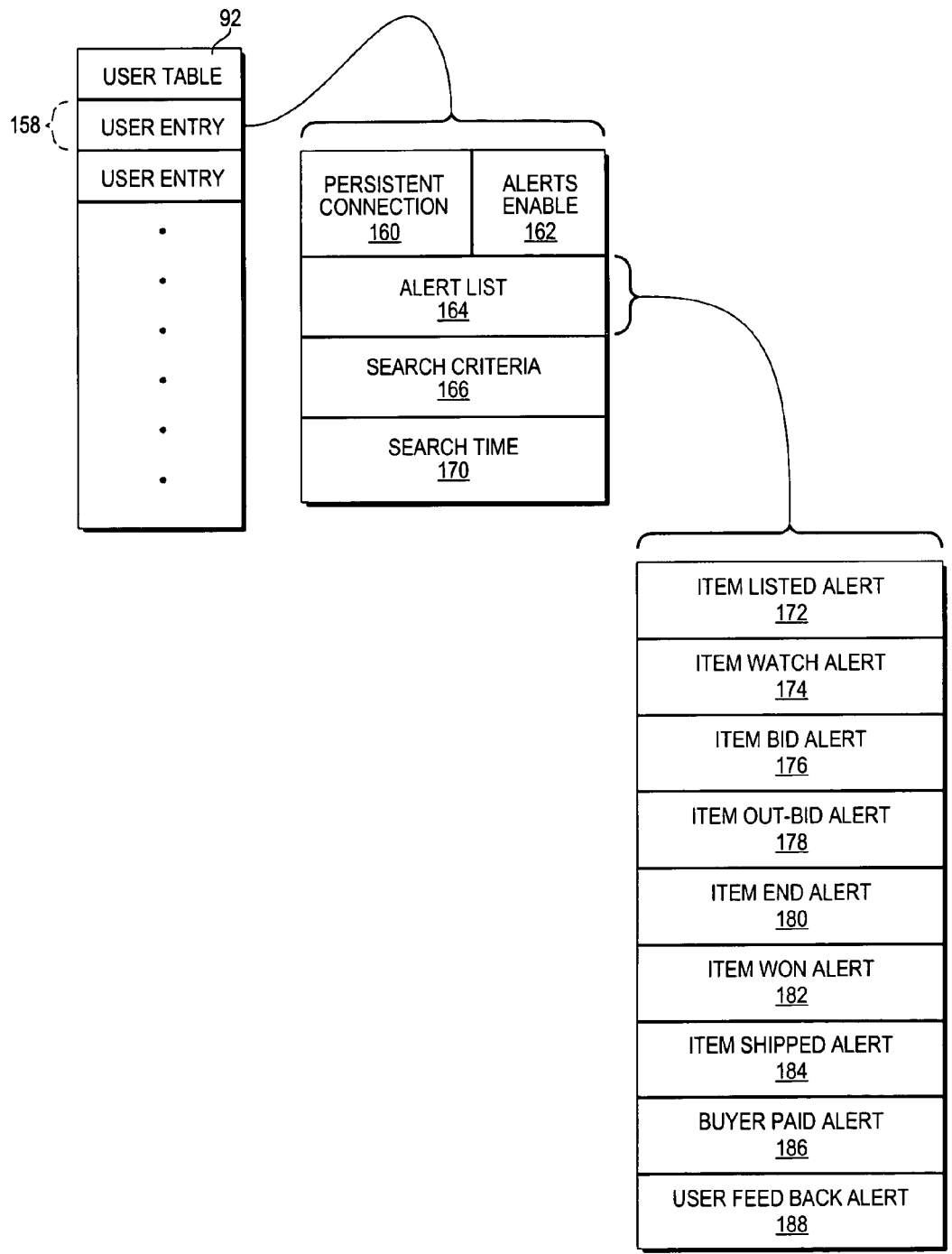
FIG. 6 is a block diagram illustrating a user table and associated data structures, according to an embodiment.

FIG. 6 is a block diagram illustrating a user table 92, according to an embodiment. The user table 92 includes a user entry 158 for each user in the network-based marketplace 12. Each user entry is associated with a persistent connection field 160, an alerts enabled field 162, an alert list 164, search criteria 166 and search time 170. The persistent connection field 160 is asserted if a persistent HTTP connection is established between the network-based marketplace 12 and a client machine 22 that corresponds to the user. A persistent HTTP connection may be utilized by the network-based marketplace 12 to initiate or push communications (e.g., alerts) from the network-based marketplace 12 to the client machine 22. The persistent HTTP connection may remain established for an indefinite period of time to accommodate the communication of alerts from the network-based marketplace 12 to the client machine 22. The alerts enabled field 162 may be asserted if the corresponding user has enabled any of the alerts that appear in the alert list 164, including an item listed alert 172, an item watch alert 174, an item bid alert 176, an item out-bid alert 178, an item end alert 180, an item won alert 182, a seller shipped alert 184 a buyer paid alert 186, and a user feedback alert 188.

The item listed alert 172 may be utilized by a user that has identified search criteria 166 (e.g., favorite search, favorite category or favorite seller) to the network-based marketplace 12 and wants to receive an alert if the network-based marketplace receives a listing for an item that may be identified with the search criteria. Search criteria may take the form of a favorite search, a favorite category or a favorite seller that is stored in the search criteria 166 in the user table 92. Search criteria 166 may be active for an indefinite period of time, a definite period of time or until a configured ending time as specified by the search time 170. While active, the search criteria 166 may be utilized as the basis to trigger an item listed alert 172. For example, a user may configure one or more favorite searches that include keywords and enable the item listed alert 172. Henceforth or until expiration, the favorite search is performed in response to the network-based marketplace 12 receiving an item listed event 142. If the item listed is found in the search results of the performed search (e.g., keywords appear in the description, title or description and title of the listed item) then an item listed alert 172 may be communicated to the user at the client machine 20, 22. Similarly, if the item listed is found in the search results performed with a search that utilizes search criteria in the form of a favorite category or listed by a favorite seller as further specified by the search criteria 166 then an item listed alert 171 may be communicated to the user at the client machine 20, 22.

The item watch alert 174 may be utilized by a user that has placed a specific item on a watch list and wants to receive an alert at designated times during an auction. For example, a user may identify one or more items that a user wishes to watch or monitor from the commencement of an auction to the end of the auction. If the user further enables the item watch alert 174 then an alert may be communicated to the user at the client machine 20, 22 in response to receiving a time remaining event 136 for a watched item.

The item bid alert 176 may be utilized by a user that has placed a bid on an item and wants to receive an alert each time a subsequent bid is placed on the item. For example, a user may bid on an item and further enable the item bid alert 176. Henceforth, an item bid alert 176 may be communicated to the user at the client machine 20, 22 in response to the network-based marketplace 12 receiving an enter bid event 144 for the item.

The item out-bid alert 178 may be utilized by a user that has placed a bid on an item and wants to receive an alert if a higher bid is received for the same item. For example, a user may bid on an item and further enable the item out-bid alert 178. Henceforth, an item out-bid alert 178 may be communicated to the user at the client machine 20, 22 in response to the network-based marketplace 12 receiving a bid on the item that is higher than the bid placed by the user.

The item end alert 180 may be utilized by a user that has placed a bid on an item or is watching an item and wants to receive an alert if the auction ends for the item. For example, a user may bid on an item or place the item on a watch list as previously described and further enable the item end alert 180. Henceforth, an item end alert 180 may be communicated to the user at the client machine 20, 22 in response to the network-based marketplace 12 receiving an auction end event 138 for the watched or bidded on item.

The item won alert 182 may be utilized by a user that has placed a bid on an item and wants to receive an alert if the user wins the auction for the item. For example, a user may bid on an item and further enable the item end alert 180. Henceforth, an item won alert 182 may be communicated to the user at the client machine 20, 22 in response to the network-based marketplace 12 receiving an auction end event 138 for an item that is included in an auction that has been won by the user.

The seller shipped alert 184 may be utilized by a buyer that has won or purchased an item from the seller and wants to receive an alert if the seller ships the item. For example, a may user win an item in an auction or purchase an item and further enable the seller shipped alert 184. Henceforth, the seller shipped alert 184 may be communicated to the user at the client machine 20, 22 in response to the network-based marketplace 12 receiving notice that the seller has shipped the item. For example, the seller or a shipping company may notify the network-based marketplace 12 that an item has been shipped thereby triggering a ship item event 148 for the item.

The buyer paid alert 186 may be utilized by a seller that has auctioned or sold an item to a buyer and wants to receive an alert if the buyer pays for the item. For example, a seller may auction an item or sell an item to a buyer and further enable the buyer paid alert 186. Henceforth, an buyer paid alert 186 may be communicated to the seller at the client machine 20, 22 in response to the network-based marketplace 12 receiving notice that the buyer has paid for the item. For example, the buyer or a third party payment service may notify the network-based marketplace 12 that the buyer has paid for the item thereby triggering the communication of a pay item event 146 for the item.

The user feedback alert 188 may be utilized by a user (e.g., subject user) that wants to receive an alert if feedback is posted on the subject user. For example, the subject user may enable the user feedback alert 189. Henceforth, a user feedback alert 188 may be communicated to the subject user at a client machine 20, 22 in response to the network-based marketplace 12 receiving feedback from an authoring user with respect to the subject user.

Figure 7:
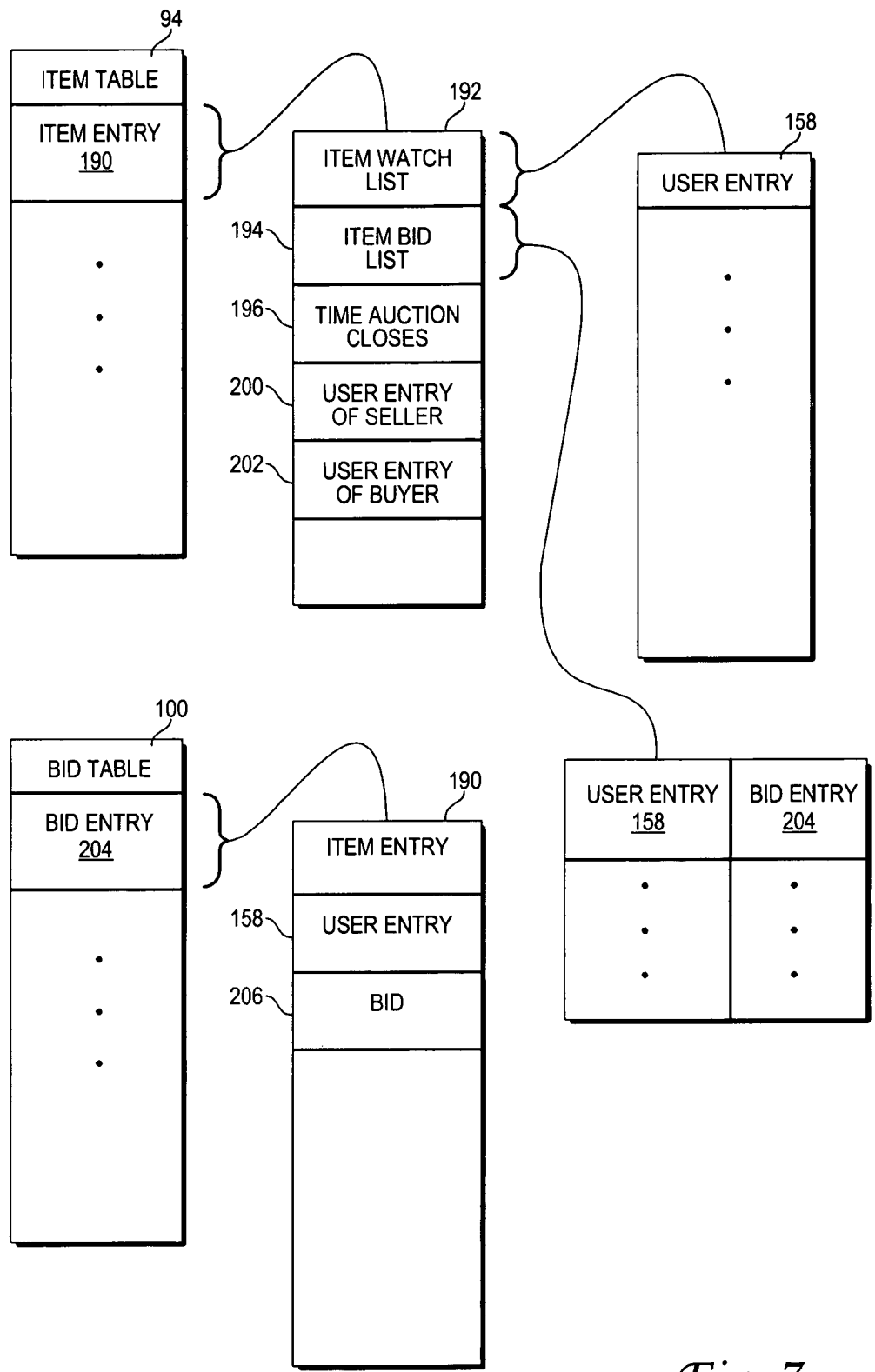
FIG. 7 is a block diagram illustrating an item table, a bid table and associated data structures, according to an embodiment.

FIG. 7 is a block diagram illustrating an items table 94 and a bids table 100, according to an embodiment. The items table 94 includes and item entry 190 for each item that has been listed on the network-based marketplace. Each item entry includes an item watch list 192, an item bid list 194, a time auction closes field 196 that indicates the time the auction closes, a user entry of seller 200 that may be utilized to identify the seller that sold the item, and a user entry of buyer field 202 that may be utilized to identify the buyer of the item (e.g., purchased the item in a sale or won the item in an auction). The item watch list 192 may include a list of user entries 158 that may be utilized to identify users that have placed the item on their respective watch lists, as previously described. The item bid list 194 includes a list of user entries 158 and bid entries 204 that may be utilized to identify bids placed on the item and corresponding users that placed the respective bids.

The bid table 100 includes a bid for each bid that has been submitted to the network-based marketplace 12. Each bid is associated with a bid entry 204 that includes bid information and a user entry 158 that may be utilized to identify the user that entered the bid.

Figure 8:
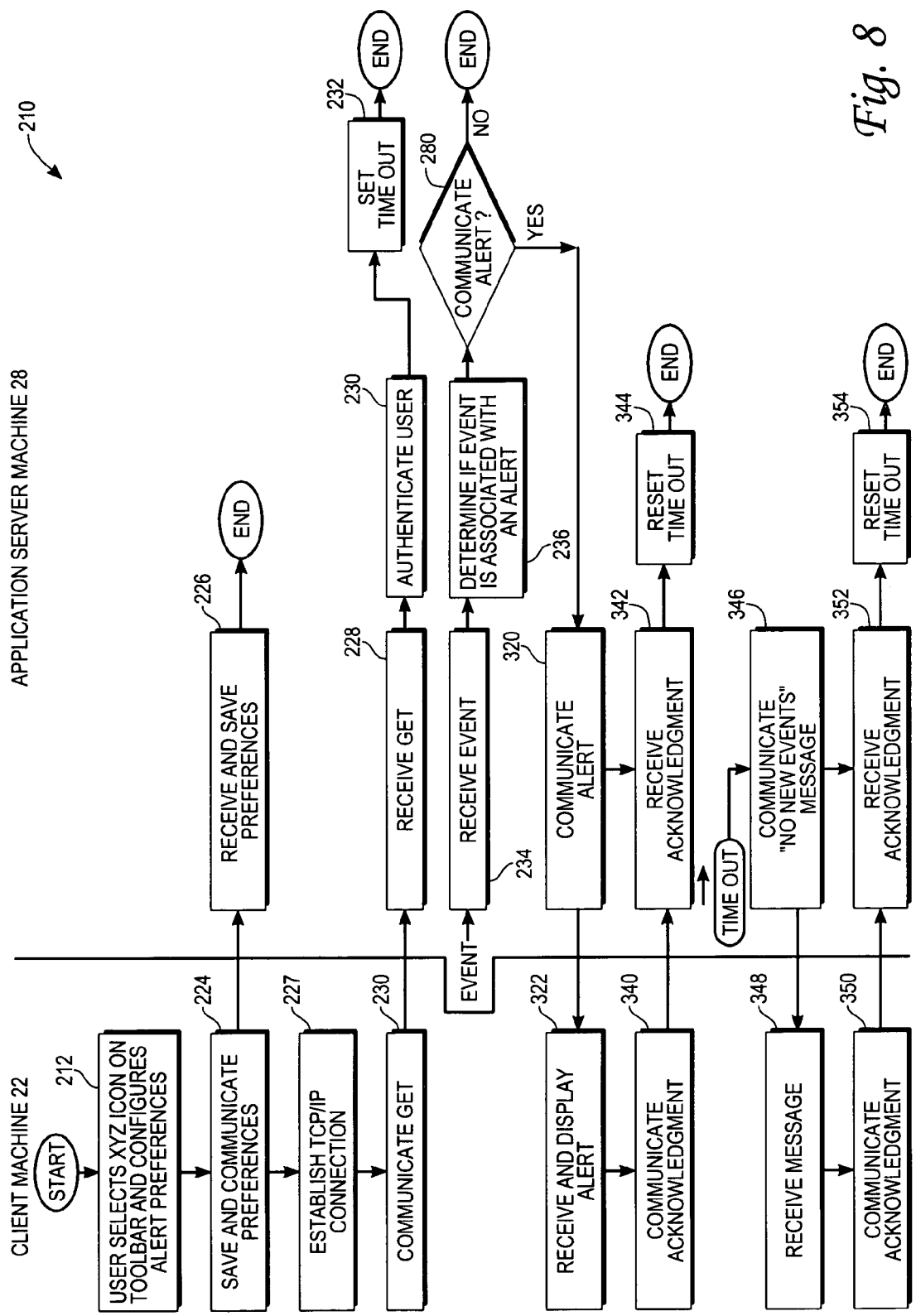
FIG. 8 is an interactive diagram illustrating a method, according to an embodiment, to alert a user at a client machine of a network-based marketplace event.

FIG. 8 is an interactive diagram illustrating a method 210, according to an embodiment, to alert a user at a client machine of a network-based marketplace event. Client operations are illustrated on the left and server operations are illustrated on the right.

Figure 16:
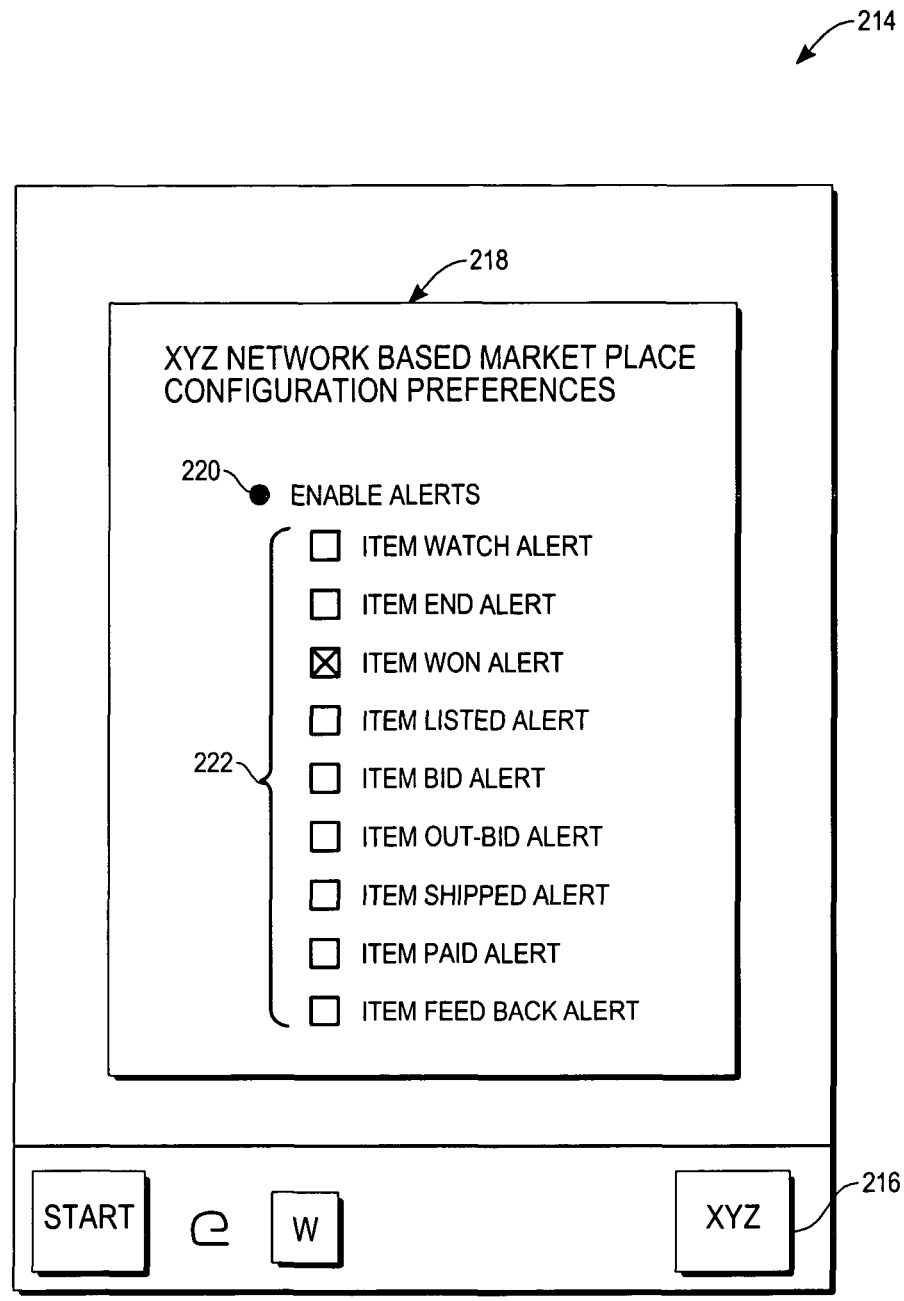
FIGS. 16-19 diagram illustrating user interfaces, according to an embodiment.

At operation 212, a user at the client machine 22 selects an icon 216 associated with an XYZ network-based marketplace 12 that is processed by the client alert module 123. FIG. 16 illustrates a user interface 214 that includes the icon 216, as located in a task bar on the lower right. In response to the selection, the client alert module 123 generates a dialogue box 218 to prompt the user to enable alert preferences with a radio button 220 and checkboxes 222. The radio button 220 may be selected by the user and may be utilized to establish a persistent HTTP connection (e.g., asserts the alerts enabled field 162 in the user table 92 and in a locally stored table). In addition, the user interface 214 illustrates one or more checkboxes 222 that also may be selected by the user to enable the receipt of the corresponding alert at the client machine 20. Returning to FIG. 8, at operation 224 the client alert module 123 locally saves the alert preferences of the user and communicates the alert preferences to the application server machine 28.

At operation 226, the receiving module 122, on the application server machine 28, receives and saves the alert preferences in the alert list 164 in the user table 92.

At operation 227, the client alert module 123 on the client machine 22, establishes a TCP/IP connection between the client machine 22 and the application server machine 28.

At operation 230, the client alert module 123 establishes a persistent HTTP connection with the application server 28. To this end, the client alert module 123 communicates an HTTP GET command via the browser 125 to the application server machine 28. The GET command includes a token that identifies the user at the client machine 22, the token previously written to a storage device associated with the client machine 22 in response to the user previously providing a valid user code and password to the network-based marketplace 12.

At operation 228, the receiving module 122 at the application server machine 28, receives the get command and utilizes the token to authenticate the user (operation 230). At operation 232, the processing module 124 sets a timeout and processing ends.

At operation 234, the receiving module 122, at the application server 28, receives a network-based marketplace event 128 that is communicated to the processing module 124.

At operation 236, the processing module 124 determines if the network-based marketplace event is associated with a network-based marketplace alert that has been requested by a user at a client machine 20, 22.

Figure 9:
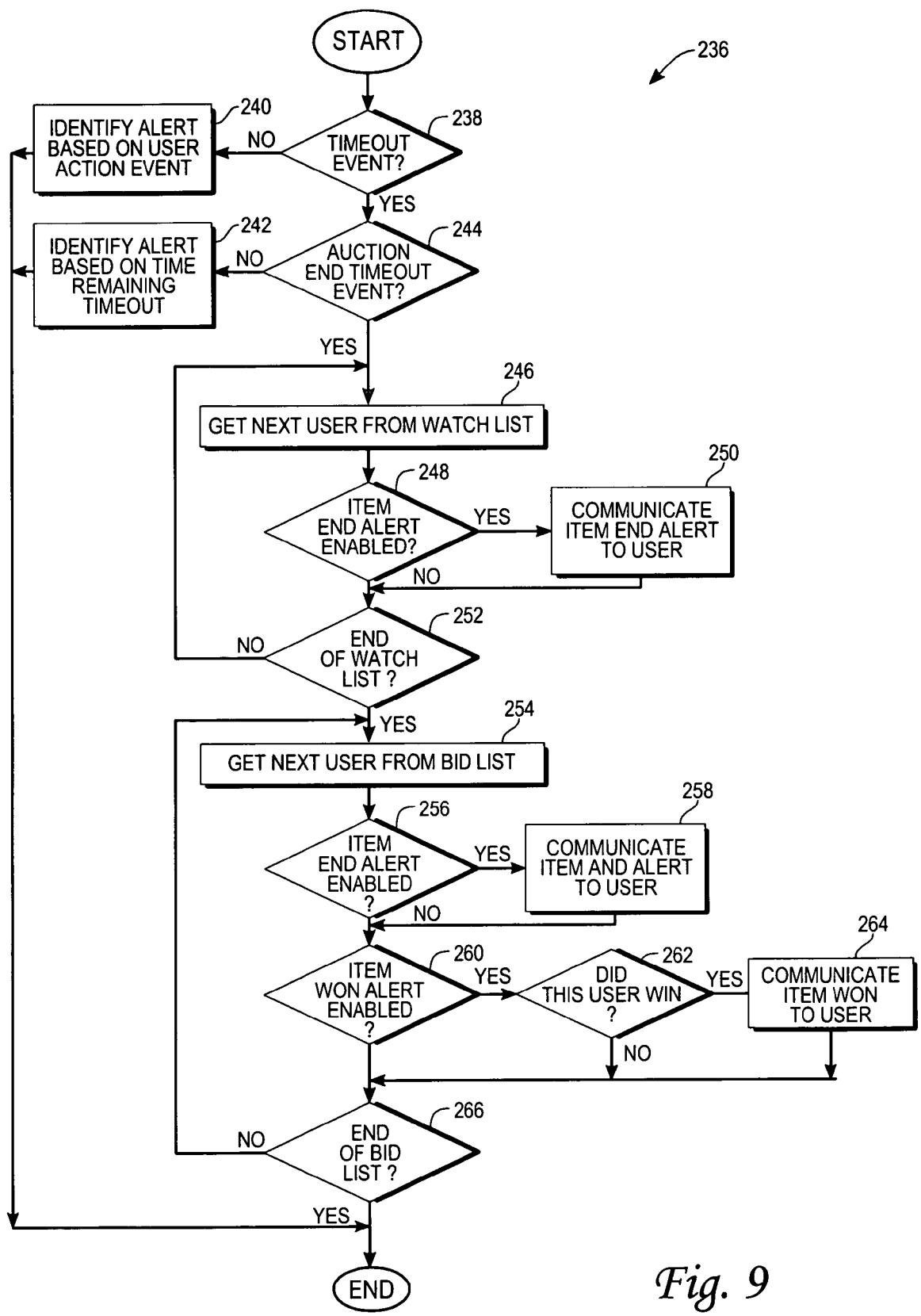
FIG. 9 is a flow chart illustrating a method, according to an embodiment, to determine if a network-based marketplace event is associated with an alert.

FIG. 9 is flow chart illustrating the operation 236, according to an embodiment. At decision operation 238, the processing module 124 determines if the network-based marketplace event 128 is a timeout event 132. If the processing module 124 determines that the network-based marketplace event 128 is a timeout event 132 then a branch is made to decision operation 244. Otherwise a branch is made to operation 240.

At decision operation 244, the processing module 124 determines if the network-based marketplace event 128 is an auction end event 138. If the processing module 124 determines that the network-based marketplace event 128 is an auction end event 138 then a branch is made to operation 246. Otherwise a branch is made to operation 242.

At operation 246, the processing module 124 utilizes the item entry 140 in the auction end event 138 to identify the appropriate item watch list 192 in the item table 94 and reads a user entry 158 from the watch list 192.

At decision operation 248, the processing module 124 determines if the identified user has enabled the item end alert 180. If the identified user has enabled the item end alert 180 a branch is made to operation 250 to register that an item end alert 180 should be communicated to the user that is identified by the user entry 158. Otherwise a branch is made decision operation 252.

At decision operation 252, the processing module 124 determines if the last item in the item watch list 192 has been processed. If the last item in the item watch list 192 has been processed then a branch is made to operation 254. Otherwise a branch is made to operation 246.

At operation 254, the processing module 124 utilizes the item entry 140 in the auction end event 138 to identify the appropriate item bid list 194 in the item table 94 and extract the next user entry 158 from the item bid list 194.

At decision operation 256, the processing module 124 determines if the identified user has enabled the item end alert 180. If the identified user has enabled the item end alert 180 a branch is made to operation 258 to register that an item end alert 180 should be communicated to the user identified by the user entry 158. Otherwise a branch is made decision operation 260. Note that the present item end alert 180 is communicated to the user because the user has previously bid on the item whereas the previous item end alert (e.g., operation 250) is communicated to the user because the user included the item on a watch list.

At decision operation 260, the processing module 124 determines if the identified user has enabled the item won alert 182. If the identified user has enabled the item won alert 182 a branch is made to decision operation 262. Otherwise a branch is made to decision operation 266.

At decision operation 262, the processing module 124 determines if the identified user has won the item (e.g., the highest bid on the item bid list 194). If the identified user has won the item then a branch is made to operation 264 to register that an item won alert 182 should be communicated to the identified user. Otherwise a branch is made decision operation 266.

At decision operation 266, the processing module 124 determines if the last bid in the item bid list 194 has been processed. If the last bid in the item bid list 194 has been processed then processing ends. Otherwise a branch is made to operation 254.

Figure 10:
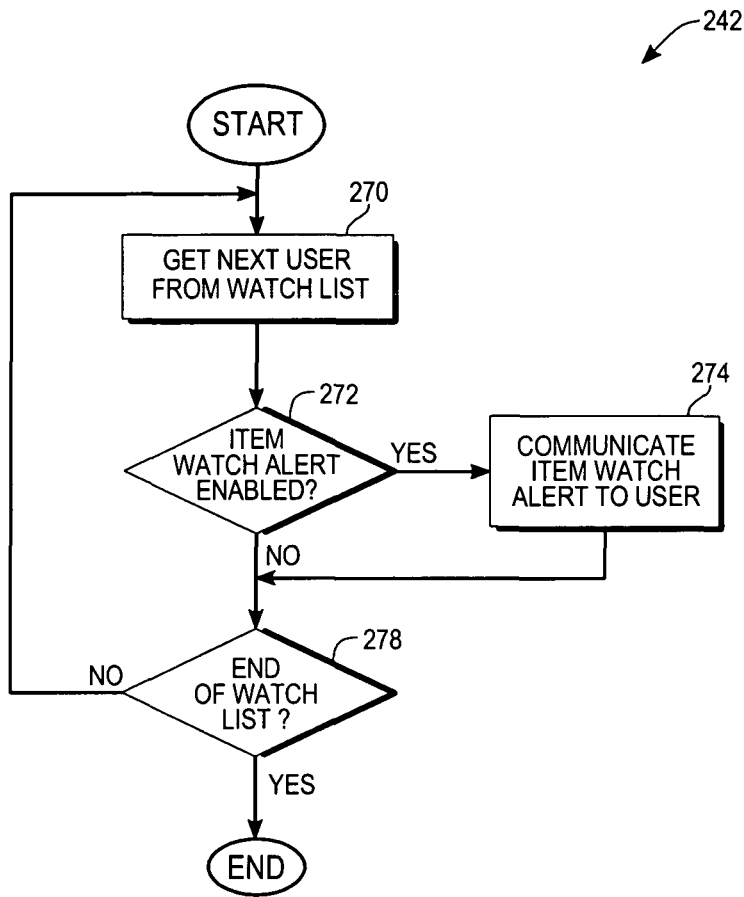
FIG. 10 is a flow chart illustrating a method, in one exemplary embodiment of the present invention, to identify an alert based on a time-remaining timeout.

At operation 242, the processing module 124 identifies alerts that should be communicated to users based on the receipt of a time remaining event 136. FIG. 10 is flow chart illustrating the method 242, according to an embodiment.

At operation 270, the processing module 124 utilizes the item entry 140 in the time remaining event 136 to identify the appropriate item watch list 192 in the item table 94 and reads the next user entry 158 from the item watch list 192.

At decision operation 272, the processing module 124 determines if the identified user (e.g., user entry 158) has enabled the item watch alert 174. If the identified user has enabled the item watch alert 174 a branch is made to operation 274 to register that an item watch alert 174 should be communicated to the user that is identified by the user entry 158. Otherwise a branch is made decision operation 278.

At decision operation 278, the processing module 124 determines if the last item in the item watch list 192 has been processed. If the last item in the item watch list 192 has been processed then a branch is made to decision operation 280 on FIG. 8. Otherwise a branch is made to operation 270.

Figure 11:
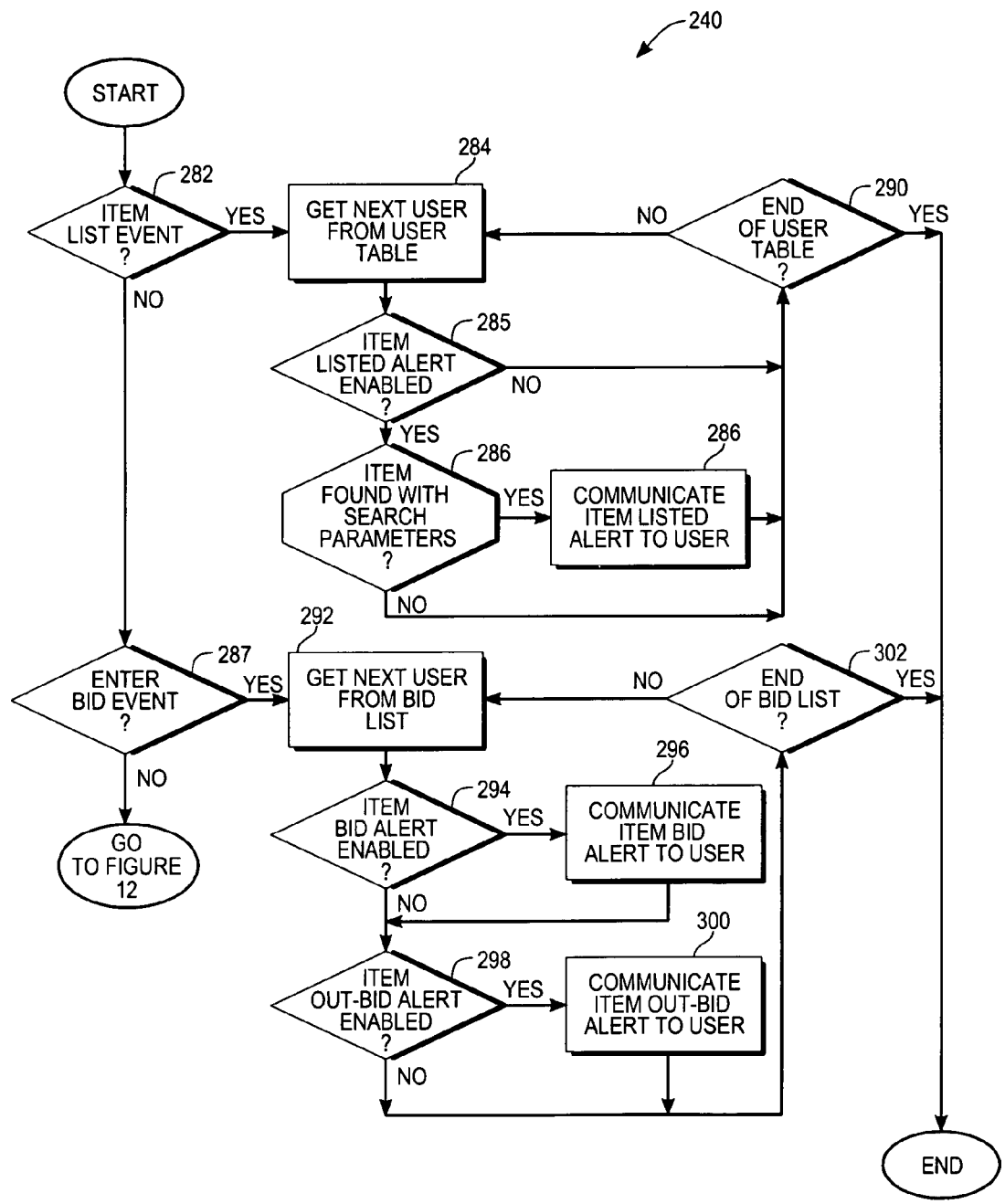
FIG. 11 is a flow chart illustrating a method, in one exemplary embodiment of the present invention, to identify an alert based on a user action event.
Figure 12:
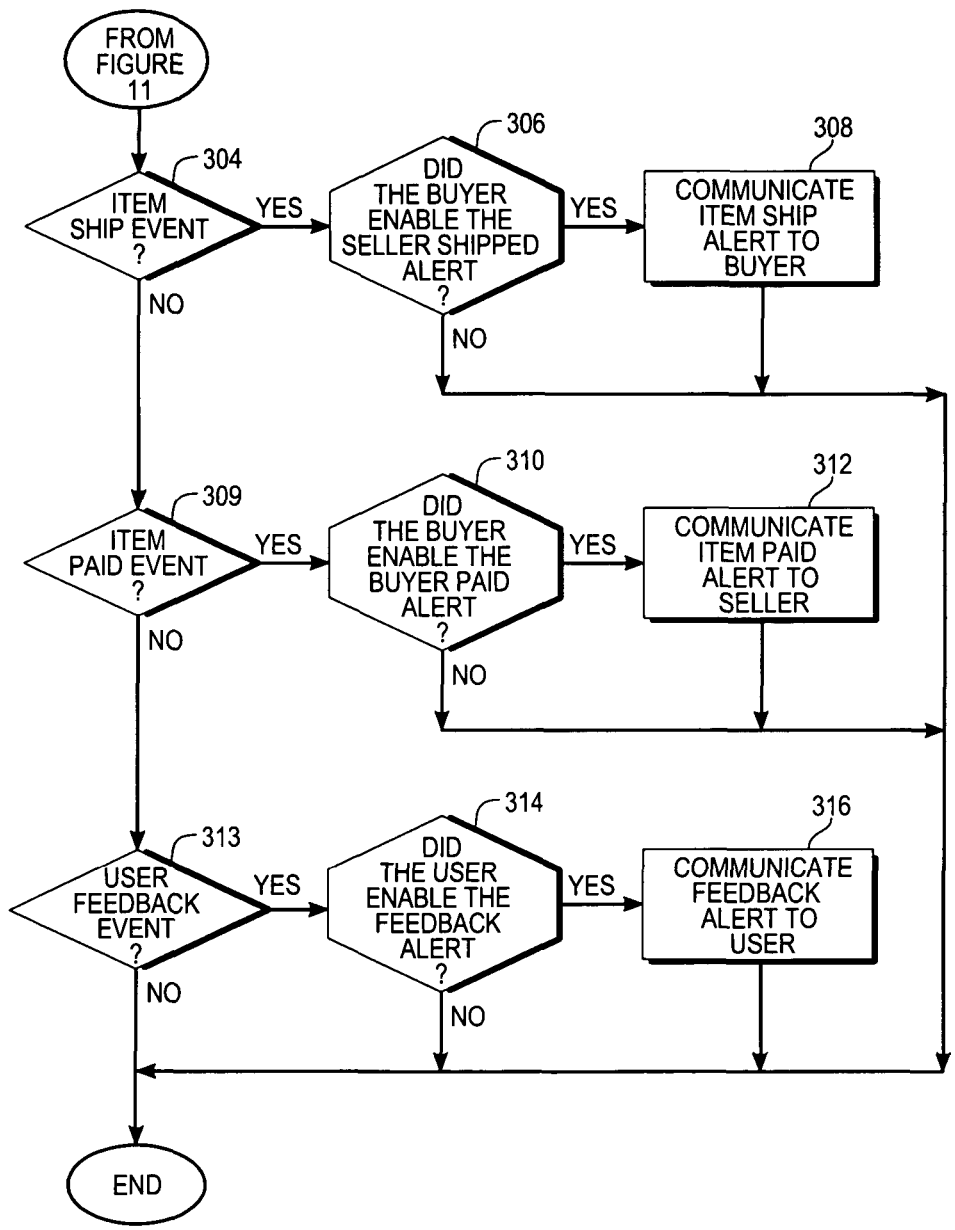
FIG. 12 is a flow chart illustrating a method, in one exemplary embodiment of the present invention, to further identify an alert based on a user action event.

Returning to FIG. 9, at operation 240, the processing module 124 identifies alerts that should be communicated to users based on the receipt of a user action event 134. FIGS. 11 and 12 are flow charts illustrating the method 240, according to an embodiment.

On FIG. 11, at operation 282, the processing module 124 examines the network-based marketplace event 128 to determine whether it is an item listed event 142. If the processing module 124 determines that the network-based marketplace event 128 is an item listed event 142 then a branch is made to operation 284. Otherwise a branch is made to decision operation 286.

At operation 284, the processing module 124 gets the next user entry 158 from the user table 92. At decision operation 285, the processing module 124 determines if the item listed alert 172 has been enabled for the user corresponding to the user entry 158. If the item listed alert 172 has been enabled then a branch is made to decision operation 286. Otherwise processing continues at decision operation 290.

At decision operation 286, the processing module 124 may utilize the search criteria 164 to execute one or more searches and determine if the item specified by the item listed event 142 is found in the search results. If the item is found in the search results a branch is made to operation 288 to register that an item listed alert 172 should be communicated to the user that is identified by the user entry 158. Otherwise a branch is made to decision operation 290.

At decision operation 290, the processing module 124 determines if the last user entry in the user table 92 has been processed. If the last user entry in the user table 92 has been processed then processing continues on FIG. 8 at decision operation 280. Otherwise processing continues at operation 284.

At decision operation 287, the processing module 124 determines if the network-based marketplace event 128 is an enter bid event 144. If the processing module 124 determines that the network-based marketplace event 128 is an enter bid event 144 then a branch is made to operation 292. Otherwise processing continues on FIG. 12 at decision operation 304.

At operation 292, the processing module 124 utilizes the item entry 140 in the enter bid event 144 to access the item bid list 194 which identifies all parties that have bid on the item. Specifically, the processing module 124 identifies a user that has bid on the item by getting the next user entry 158 in the item bid list 194. At decision operation 294, the processing module 124 determines if identified user has enabled an item bid alert 176. If the item bid alert 176 has been enabled then a branch is made to operation 296. Otherwise processing continues at decision operation 298.

At operation 296, the processing module 124 registers that an item bid alert 176 should be communicated to the user that is identified by the current user entry 158.

At decision operation 298, the processing module 124 determines if identified user has enabled the item out bid alert 178. If the item out bid alert 178 has been enabled then a branch is made to operation 300. Otherwise processing continues at decision operation 302.

At operation 300, the processing module 124 registers that an item out bid alert 178 should be communicated to the user that is identified by the current user entry 158. Otherwise a branch is made to decision operation 302.

At decision operation 302, the processing module 124 determines if the last bid in the item bid list 194 has been processed. If the last bid has been processed then processing continues on FIG. 8 at decision operation 280. Otherwise processing continues at operation 292.

On FIG. 12, at decision operation 304, the processing module 124 determines if the network-based marketplace event 128 is a ship item event 148. If the processing module 124 determines that the network-based marketplace event 128 is the ship item event 148 then a branch is made to decision operation 306. Otherwise processing continues at decision operation 308.

At decision operation 306 the processing module 124 utilizes the item entry 140 in the ship item event 148 to access the item table 94 and reads the user entry of the buyer 202. Next, the processing module 124 determines if buyer has enabled the seller shipped alert 184. If the buyer has enabled the seller shipped alert 184 then a branch is made to operation 308. Otherwise processing continues on FIG. 8 at decision operation 280.

At operation 308, the processing module 124 registers that the seller shipped alert 184 should be communicated to the buyer and processing continues on FIG. 8 at decision operation 280.

At decision operation 309, the processing module 124 determines if the network-based marketplace event 128 is a pay item event 146. If the processing module 124 determines that the network-based marketplace event 128 is a pay item event 146 then a branch is made to decision operation 310. Otherwise processing continues at decision operation 313.

At decision operation 310 the processing module 124 utilizes the item entry 140 in the pay item event 146 and the user entry of the seller 200 in the pay item event 146 to read the corresponding user entry 158 in the item table 94. Next, the processing module 124 determines if seller has enabled the buyer paid alert 187 by accessing the alert list 164 associated with the seller in the user table 92. If the seller has enabled the buyer paid alert 310 then a branch is made to operation 312. Otherwise processing continues on FIG. 8 at decision operation 280.

At operation 312, the processing module 124 registers that a buyer paid alert 186 should be communicated to the buyer and processing continues on FIG. 8 at decision operation 280.

At decision operation 313, the processing module 124 determines if the network-based marketplace event 128 is a feedback event 150. If the processing module 124 determines that the network-based marketplace event 128 is a feedback event 150 then a branch is made to decision operation 314. Otherwise processing continues on FIG. 8 at decision operation 280.

At decision operation 314, the processing module 124 utilizes the subject user entry 156 in the feedback event 150 to access the corresponding user entry 158 in the user table 92 and determine if the user (e.g., the subject of the feedback) has enabled the user feedback alert 188. If the user has enabled the user feedback alert 188 then a branch is made to operation 316. Otherwise processing continues on FIG. 8 at decision operation 280.

At operation 316, the processing module 124 registers that a user feedback alert 188 should be communicated to the subject of the feedback and processing continues on FIG. 8 at decision operation 280.

Returning to FIG. 8 at decision operation 280, the processing module 124 determines if a network-based marketplace alert has been registered to be communicated to the user at the client machine 22 over a persistent HTTP connection. If a network-based marketplace alert has been registered to be communicated to the client machine 22 over a persistent connection then processing continues at operation 320, otherwise processing ends.

At operation 320, a communicating module 126 communicates the network-based marketplace alert to the client machine 22. The network-based marketplace alert includes appropriate network-based marketplace information to properly alert the user with regard to the alert. For example, alerts related to items (e.g., item listed alert 172, item watch alert 174, etc.) may include network-based marketplace information such as an item name, an item picture, an item number, an item description, etc. Alerts related to the auction of an item (e.g., item bid alert 176, item out-bid alert 178, item end alert 180, etc.) may include additional network-based marketplace information such as the highest bid, bids made by the user that received the alert, the time left in the auction, the name of the highest bidder, the status of the auction (e.g., open, closed, etc), a notice for the user that received the alert (e.g., "You are the Winner", "Auction Over", etc.). Alerts related to a transaction between a buyer and seller (e.g., seller shipped alert 184, buyer paid alert 186, user feedback alert 188, etc.) may include network-based marketplace information such as notice to the buyer that the seller has shipped the item (e.g., item number, name of shipper, item name, etc.), notice to the seller that the buyer has paid for the item (e.g., item number, name of payment service, name of credit service, item name, amount paid, etc.), feedback on the seller or buyer (e.g., free form text, a rating on a discrete scale, name of seller, name of buyer, etc.).

Figure 17:
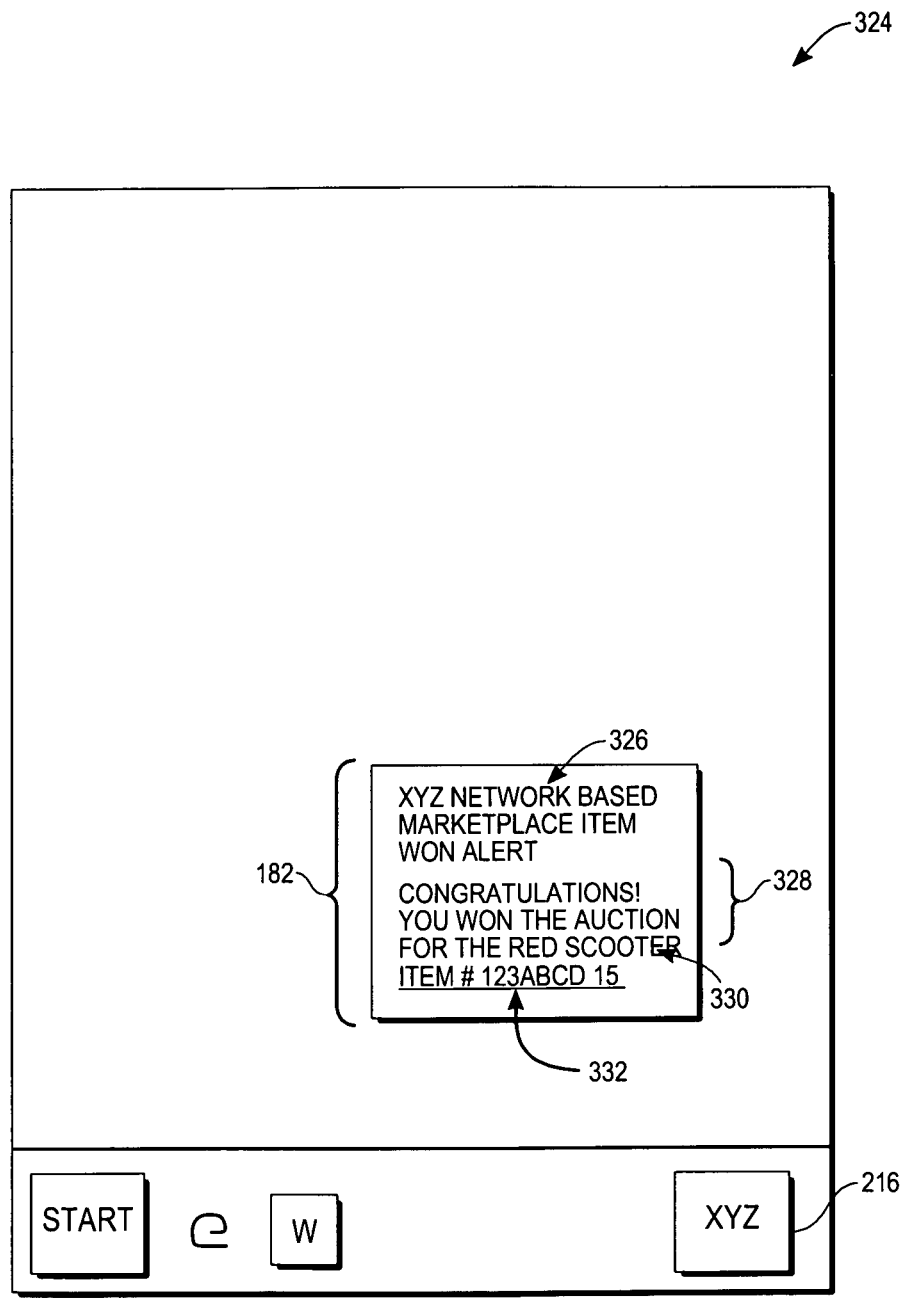

At operation 322, the client alert module 123 at the client machine 22, receives and displays the network-based marketplace alert. FIG. 17 illustrates a user interface 324, according to an embodiment, with an item won alert 182. The item won alert 182 includes an alert title 326, a notice 328 that the recipient of the alert has won the auction, a title 330 of the won item, and an item number 332 that may be an HTTP link to a web page with additional information about the won item.

Returning to FIG. 8, at operation 340, the client alert module 123 communicates an acknowledgement to the application server machine 28 that is received by the receiving module 124 at the application server machine 28 (operation 342)

At operation 344, the processing module 124 resets a timeout that is associated with the persistent HTTP connection between the client machine 22 and the application server machine 28.

At operation 346, a timeout expires at the application server machine 28 thereby invoking the processing module 124 to communicate a "no new events" message to the client machine 22.

At operation 348, the client alert module 123 receives the "no new events" message and at operation 350 communicates an acknowledgement back to the application server machine 28. Receipt of the "no new events" message prevents the browser 125 from timing out the HTTP GET command communicated at operation 230.

At operation 352, the receiving module 124, at the application server machine 28, receives the acknowledgement. At operation 354, the processing module 124 resets a timeout that is associated with the persistent HTTP connection between the client machine 22 and the application server machine 28.

It will be appreciated that the embodiment described above utilizes a version of HTTP (e.g., HTTP/1.1) that supports sending several HTTP requests to the application server machine 28 over a single TCP/IP connection. Another embodiment may utilize a version of HTTP (e.g., HTTP/1.0) that supports sending only a single HTTP request to the application server machine 28 over a TCP/IP connection. In the latter embodiment, the client machine 22 may establish and maintain the persistent connection with the application server machine 28 by breaking down and reestablishing the TCP/IP connection in response to each alert and each "no new events" message that are received at the client machine 22.

Thus, broadly, a user may enable network-based marketplace alerts that may be communicated to the user at the client machine 20, 22 in response to the receipt of an associated network-based marketplace event. The user automatically receives the alert and need not establish an HTTP connection to poll the network-based marketplace 12 to receive the alert because the alert may be communicated to the user at the client machine 20, 22 over a persistent HTTP connection between the client machine 20, 22 and the application server machine 28.

Figure 13:
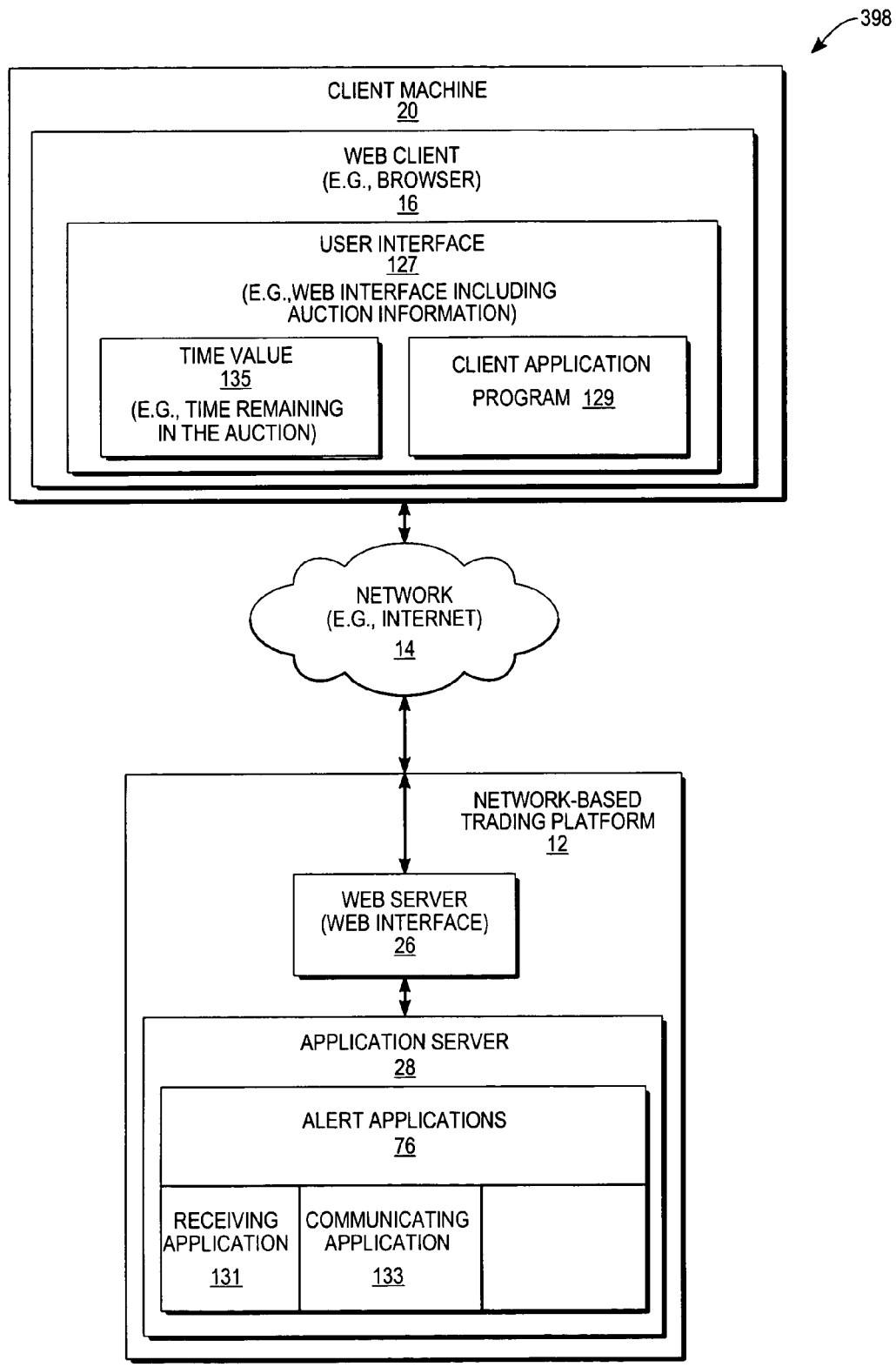
FIG. 13 is a network diagram depicting a system, according to an embodiment, to alert a user at a client machine of a network-based marketplace event that is associated with auction information.

FIG. 13 is a network diagram illustrating a system 398, according to one embodiment. The system 398 corresponds to the system 10 and, accordingly, the same or similar references have been used to indicate the same or similar features unless otherwise indicated. According to a second aspect as described above, the system 398 is broadly shown to alert a user at a client machine of a network-based marketplace event that is associated with auction information. To this end, the system 398 is shown to provide a browser 125, a receiving application 131, and a communicating application 133. The browser 125 is illustrated as including a user interface 127 that is communicated to the client machine 20 from the application server 28. In one embodiment the user interface 127 may be a web interface that may include auction information in the form of bidding information for a listing or item that is being auctioned. For example, bidding information may include the title of the item, the highest bid, the time remaining in the auction, etc. The user interface 127 is further illustrated to include a client application program 129 and a time value 135. The client application program 129 may be embodied as a Java Applet, a Java Script, a browser plug-in, a MS COM Object, Microsoft VB Script, etc. and may be utilized to display the bidding information described above and to display a countdown timer that indicates the time remaining in the auction. In addition, the client application program 129 utilizes the time value 135 to initialize the countdown timer and to determine when to request the user interface 127 (e.g., refresh). In some embodiments the client application program 129 requests the user interface 127 with increasing frequency as the time remaining in the auction approaches the end of the auction. Thus, the client application program 129 may automatically facilitate the retrieval of the most recent bidding information for an item or listing.

The receiving application 131 may receive a bid for an item, a network-based marketplace event, or a request for user interface. In response to receiving the bid for the item, the receiving application 131 stores the bid in a bids table 100 and generates a user interface that includes bidding information. In response to receiving a network-based marketplace event, the receiving application 131 may store a bid in the bid table 100 and perform other operations. In response to receiving a request for a user interface, the receiving application 131 may generate a user interface.

The communicating application 133 may communicate a user interface to a client machine 20. For example, in one embodiment the communication application may communicate a user interface that includes listing and bidding information to the client machine 20.

It will be appreciated that another embodiment of the above described system 398 may include the communicating module 126 communicating a user interface via an API server 24 (e.g., over a persistent HTTP connection) to a programmatic client 18 at the client machine 22 (see FIG. 1). Yet another embodiment may include the communicating module 126 communicating a user interface via the API server 24 or the web server 26 (e.g., over a persistent=HTTP connection) to a third party application 38 at the third party server 40 (see FIG. 1).

Figure 14:
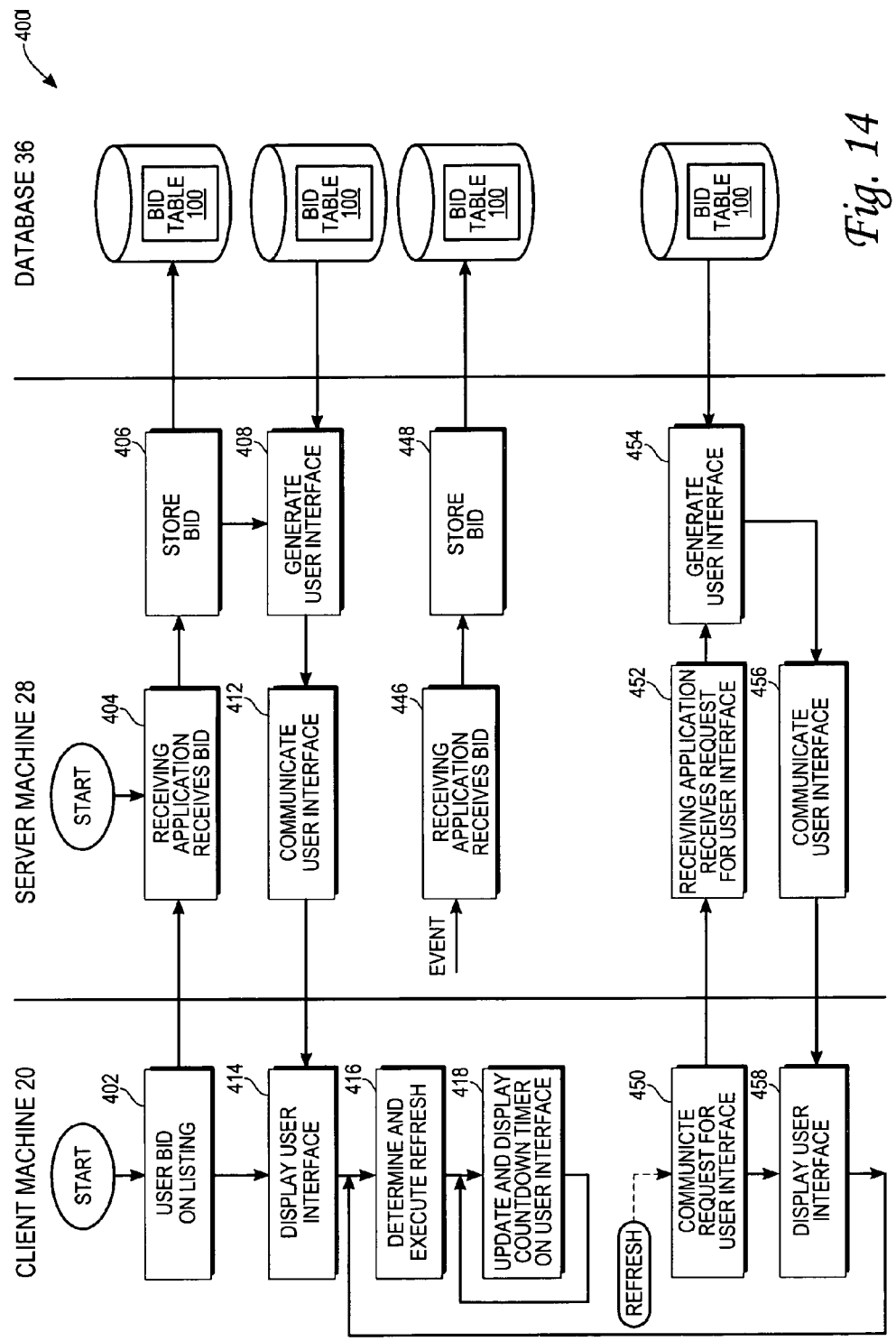
FIG. 14 is an interactive flow chart illustrating a method, according to an embodiment, alert a user at a client machine of a network-based marketplace event that is associated with auction information.
Figure 15:
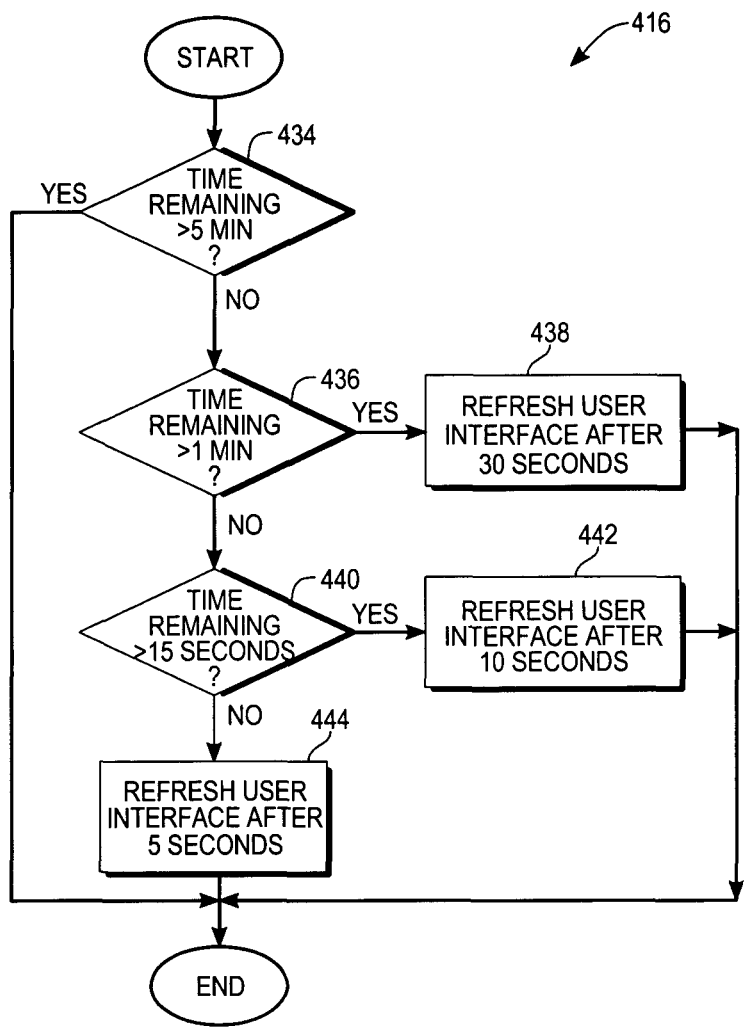
FIG. 15 is a flow chart illustrating a method, according to an embodiment, to determine and execute a user interface refresh.

FIG. 14 is an interactive flow chart illustrating a method 400, according to an embodiment, to alert a user at a client machine of a network-based marketplace event that is associated with auction information. Client operations are illustrated on the left and server operations are illustrated on the right.

At operation 402, a user, John Doe, at the client machine 20 signs on to the network-based marketplace 12 and browses the network-based marketplace 12 to find an item, a red scooter, for auction. The user, John Doe, determines the highest bid (e.g., current bid) to be relatively low, the time remaining in the auction to be brief and enters a bid for $10.00 USD.

At operation 404, the receiving application 131 at the application server machine 28, receives the bid for the red scooter and at operation 406 stores the bid in the bid table 100 on the database 36.

At operation 408, the receiving application 131 generates a user interface 127 that includes listing information for the red scooter and bidding information with regard to the auction for the red scooter, including the $10.00 bid, as entered by John Doe.

At operation 412, the communicating application 133, communicates the user interface 127 to the client machine 20, the user interface 127 including user interface elements, HTML metadata, etc., a client application program 129 and a time value 135 that represents the time remaining in the auction for the red scooter.

Figure 18:
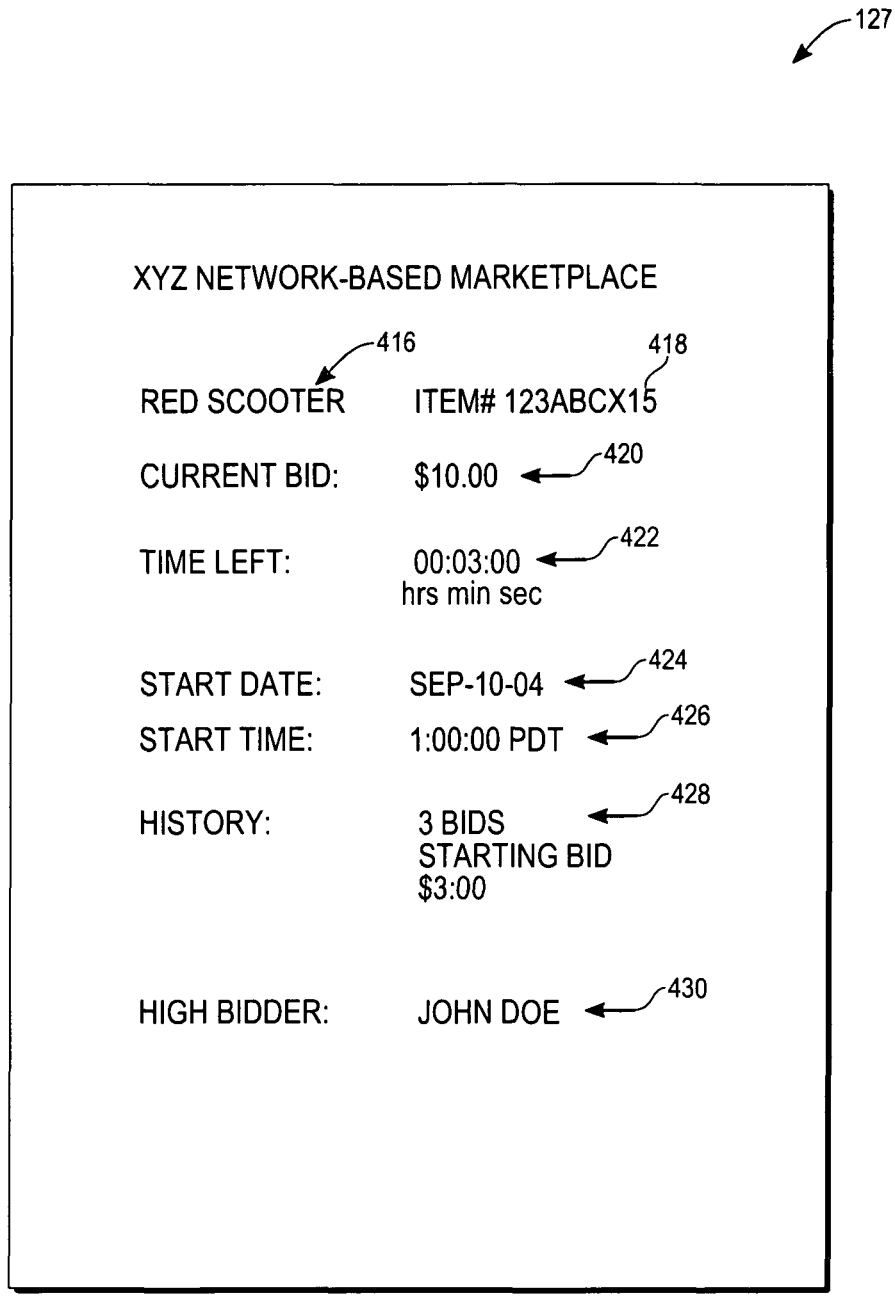

At operation 414, the browser 125 at the client machine 20 receives the user interface 127 and utilizes web client 16 (e.g., browser) and the client application program 129 to display the user interface 127 to the user. FIG. 18 illustrates the user interface 127, according to one embodiment. The user interface 127 includes an item title 416, an item number 418, a current bid 420 (e.g., the highest bid), a count down timer 422, an auction start date 424, an auction start time 426, an auction history 428 and a high bidder 430. The item title 416, red scooter, is the seller provided title of the item for auction. The item number 418 was assigned to the Red Scooter by the network-based marketplace 12 in response to the seller listing the Red Scooter on the network-based marketplace 12. The count down timer 422 indicates the time remaining before the auction is closed and a winner is announced. The auction start date 424 and auction start time 426 indicate the date and time that the auction commenced. The history 428 indicates the number of bids entered for the red scooter and the starting bid (e.g., $3.00). Finally, the high bidder 430 provides the name of the bidder that has entered the current bid 420, John Doe.

Returning to FIG. 14, at operation 416, the client application program 129 determines a refresh time and executes a refresh. FIG. 14 is a flow chart illustrating a method 416, according to an embodiment, to determine a refresh time and execute a refresh.

At decision operation 434, the client application program 129 utilizes the time value 135 to determine if the time remaining in the auction is greater than five minutes. If the time remaining in the auction is greater than five minutes processing continues on FIG. 14, at operation 418. Otherwise a branch is made to decision operation 436.

At decision operation 436, the client application program 129 utilizes the time value 135 to determine if the time remaining in the auction is greater than one minute. If the time remaining in the auction is greater than one minute processing continues, at operation 438. Otherwise a branch is made to decision operation 440.

At operation 438, the client application program 129 executes a refresh command (e.g., HTTP refresh) with a refresh time of thirty seconds and processing continues on FIG. 14, at operation 418.

At decision operation 440, the client application program 129 utilizes the time value 135 to determine if the time remaining in the auction is greater than fifteen seconds. If the time remaining in the auction is greater than fifteen seconds a branch is made to operation 442. Otherwise a branch is made to operation 444.

At operation 442, the client application program 129 executes a refresh command with a refresh time of 10 seconds and processing continues on FIG. 14, at operation 418.

At operation 444, the client application program 129 executes a refresh command with a refresh time of five seconds and processing continues on FIG. 14, at operation 418. It will be appreciated that other embodiments may utilize other time remaining values to determine the above mentioned refresh times or other refresh times.

Returning to FIG. 14, at operation 418, the client application program 129 continues to update and display the countdown timer 422 in real time until interrupted by the browser 125 as described below at operation 450.

At operation 446, the receiving application 131 receives an enter bid event 144 and at operation 448 the receiving application 131 stores the bid in the bid table 100 on the database 136.

At operation 450, the refresh time has expired thereby triggering the browser 125, at the client machine 20, to interrupt the client application program 129 and request the user interface 127 from the application server machine 28.

At operation 452, the receiving application 131 receives the request for the user interface 127 and at operation 454, the receiving application 131 generates a user interface 127 that includes listing information for the red scooter and bidding information with regard to the auction for the red scooter.

At operation 456, the communicating application 133, communicates a user interface 419 to the client machine 20.

Figure 19:
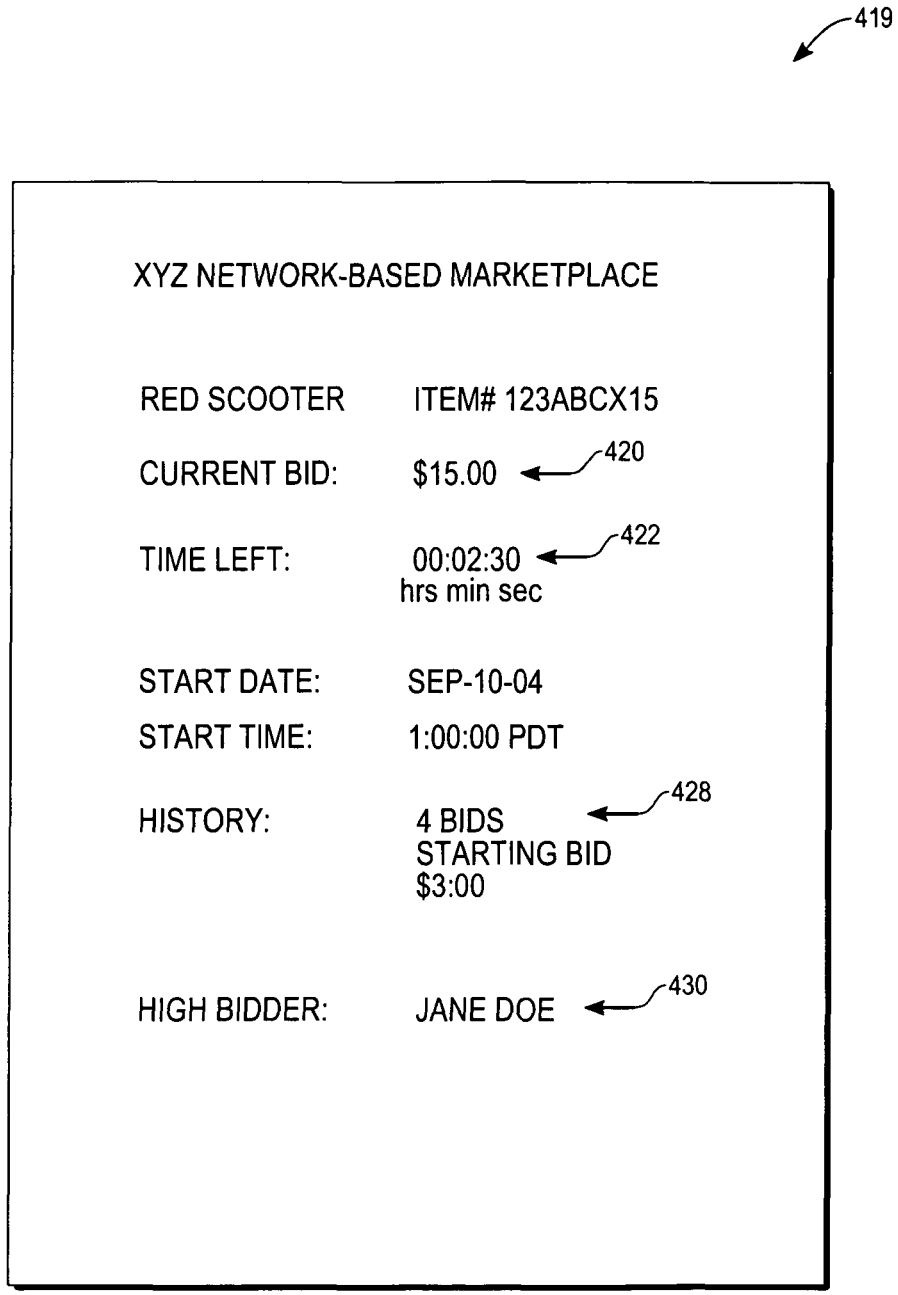

At operation 458, the browser 125 at the client machine 20 receives the user interface 419 and utilizes the client application program 129 to display the user interface 419 to the user. FIG. 19 illustrates the user interface 419, according to one embodiment. The user interface 419 includes a current bid 420 (e.g., the highest bid) that has been updated based on the enter bid event received at operation 446, a count down timer 422 that has been updated due to elapsed time, and an high bidder 430 that has also been updated based on the enter bid event 144 received at operation 446. For example, the current bid 420 is updated from "$10.00" to "15.00" and the high bidder 430 has been updated from "John Doe" to "Jane Doe", based on the enter bid event 144 received at operation 446. Note that the count down timer 422 has been updated from three minutes to two minutes and thirty seconds. Finally, processing continues at operation 416.

Thus, broadly, a user at a client machine may enter a bid for an item for auction and receive the most recent bidding information for the item in the form of a user interface that is automatically communicated to the client machine responsive to the client machine automatically requesting the user interface.

Figure 20:
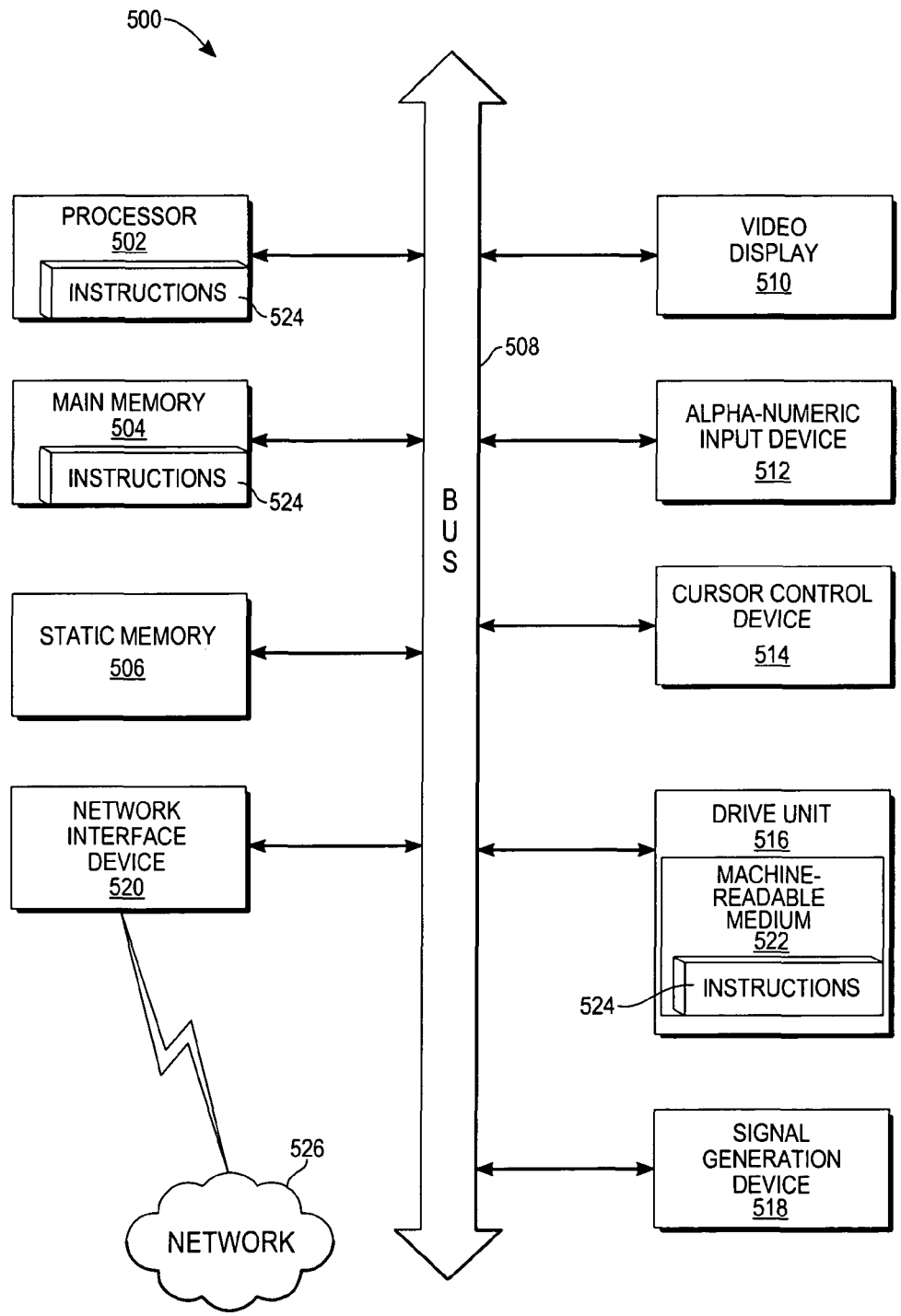
FIG. 20 illustrates a diagrammatic representation of a machine, in the exemplary form of a computer system, within which a set of instructions, for causing the machine to perform any one or more of the methodologies discussed herein, may be executed.

FIG. 20 shows a diagrammatic representation of machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 300 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 592 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, methods and systems to alert a user of a network-based marketplace event have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to alert a user at a client machine of a network-based marketplace event, the method comprising:
receiving the network-based marketplace event;
determining the network-based marketplace event is associated with an item listed alert that has been requested by the user, the item listed alert corresponding to a listing of an item identified in a search based on search criteria received from the user; and
communicating the item listed alert to the client machine over a persistent connection, the item listed alert to alert the user at the client machine of the network-based marketplace event.

2. The method of claim 1, further comprising receiving a request to establish the persistent connection with the client machine before receiving the network-based marketplace event.

3. The method of claim 1, wherein the determining is performed responsive to receiving the network-based marketplace event.

4. The method of claim 1, further comprising communicating a message that indicates no new network-based marketplace events based on receiving a timeout.

5. The method of claim 1, wherein the determining includes determining a second network-based marketplace event is associated with a network-based marketplace alert selected from a group of alerts that include an item watch alert, an item bid alert, an item out-bid alert, an item end alert, an item won alert, a seller shipped alert, a buyer paid alert, and a user feedback alert.

6. The method of claim 1, wherein the communicating the item listed alert is performed responsive to the listing of the item on the network-based marketplace that is included in search results of a search that is generated based on search criteria that has been saved.

7. The method of claim 5, wherein the communicating the item watch alert is preformed responsive to determining a predetermined period of time before an auction ends.

8. The method of claim 5, wherein the communicating the item bid alert is performed responsive to receiving a bid for an item.

9. The method of claim 5, wherein the communicating the item out-bid alert is performed responsive to receiving a bid for an item that the user has previously bid on.

10. The method of claim 5, wherein the communicating the item end alert is performed responsive to an end of an auction.

11. The method of claim 5, wherein the communicating the item won alert is performed responsive to the user winning an auction.

12. The method of claim 5, wherein the communicating the seller shipped alert is performed responsive to receiving a communication from a seller that an item has shipped.

13. The method of claim 5, wherein the communicating the buyer paid alert is performed responsive to receiving payment from a buyer.

14. The method of claim 5, wherein the communicating the user feedback alert is performed responsive to receiving feedback on the user.

15. A system to alert a user at a client machine of a network-based marketplace event, the system comprising:
- a processor;
- a computer readable storage medium including a set instructions stored thereon which, when executed by the processor, operate:
- a receiving module to receive the network-based marketplace event;
- a processing module to determine the network-based marketplace event is associated with an item listed alert that has been requested by the user, the item listed alert corresponding to a listing of an item identified in a search based on search criteria received from the user; and
- a communicating module to communicate the item listed alert to the client machine over a persistent connection, the item listed alert to alert the user at the client machine of the network-based marketplace event.

16. The system of claim 15, wherein the receiving module is to receive a request to establish the persistent connection with the client machine before the receiving module is to receive the network-based marketplace event.

17. The system of claim 15, wherein the processing module is to determine in response to receipt of the network-based marketplace event.

18. The system of claim 15, wherein the communicating module is to communicate a message that indicates no new network-based marketplace events based on receiving a timeout.

19. The system of claim 15, wherein the processing module is to determine a second network-based marketplace event that is associated with a network-based marketplace alert that is selected from a group of alerts that include an item watch alert, an item bid alert, an item out-bid alert, an item end alert, an item won alert, a seller shipped alert, a buyer paid alert, and a user feedback alert.

20. The system of claim 15, wherein the communicating module is to communicate the item listed alert for the item that is listed on the network-based marketplace and included in search results of a search that is generated based on search criteria that has been saved.

21. The system of claim 19, wherein the communicating module is to communicate the item watch alert for a predetermined period of time before an auction ends.

22. The system of claim 19, wherein the communicating the item bid alert is performed responsive to receiving a bid for an item.

23. The system of claim 19, wherein the communicating the item out-bid alert is performed responsive to receiving a bid for an item that the user has previously bid on.

24. The system of claim 19, wherein the communicating the item end alert is performed responsive to an end of an auction.

25. The system of claim 19, wherein the communicating the item won alert is performed responsive to the user winning an auction.

26. The system of claim 19, wherein the communicating the seller shipped alert is performed responsive to receiving a communication from a seller that an item has shipped.

27. The system of claim 19, wherein the communicating the buyer paid alert is performed responsive to receiving payment from a buyer.

28. The system of claim 19, wherein the communicating the user feedback alert is performed responsive to receiving feedback on the user.

29. A machine readable storage medium storing a set of instructions that, when executed by a machine, cause the machine to perform operations comprising:
- receiving a network-based marketplace event;
- determining the network-based marketplace event is associated with an item listed alert that has been requested by the user, the item listed alert corresponding to a listing of an item identified in a search based on search criteria received from the user; and
- communicating the item listed alert to the client machine over a persistent connection, the item listed alert to alert the user at the client machine of the network-based marketplace event.

30. A method to alert a user at a client machine of a network-based marketplace event that is associated with auction information, the method comprising:
- receiving a request for a user interface that includes the auction information, the request automatically generated by a client application program at the client machine; and
- communicating the auction information to the client machine responsive to the receiving the automatically generated request, the auction information updated based on the network-based marketplace event, the network-based marketplace event associated with an item listed alert, the item listed alert corresponding to a listing of an item identified in a search based on search criteria received from the user.

31. The method of claim 30, wherein the client application program is utilized to display a countdown timer at the client machine.

32. The method of claim 31, wherein the client application program is included in the user interface that is communicated to the client machine.

33. The method of claim 32, wherein the receiving the user interface occurs with greater frequency as the auction approaches a predetermined time to close.

34. The method of claim 33, wherein the countdown timer displays a time remaining in the auction.

35. The method of claim 33, wherein the auction information includes bidding information.

36. The method of claim 35, wherein the bidding information includes an outbid.

37. A system to alert a user at a client machine of a network-based marketplace event that is associated with auction information, the system comprising:
- at least one processor for executing:
- a receiving application to receive a request for a user interface that includes the auction information, the request automatically generated by a client application program at the client machine; and
- a communicating application to communicate the user interface to the client machine responsive to the receipt of the automatically generated request, the user interface to include the auction information that is updated based on the network-based marketplace event, the network-based marketplace event associated with an item listed alert, the item listed alert corresponding to a listing of an item identified in a search based on search criteria received from the user.

38. The system of claim 37, wherein the client application program is utilized to display a countdown timer at the client machine.

39. The system of claim 38, wherein the client application program is included in the user interface that is communicated to the client machine.

40. The system of claim 39, wherein the receiving application is to receive a request for the user interface with increasing frequency as the auction approaches a predetermined time to close.

41. The system of claim 38, wherein the countdown timer displays a time remaining in the auction.

42. The system of claim 37, wherein the auction information includes bidding information.

43. The system of claim 42, wherein the bidding information includes an outbid.

44. A machine readable storage medium storing a set of instructions that, when executed by a machine, cause the machine to perform operations comprising:
receiving a request for a user interface that includes auction information, the request automatically generated by a client application program at the client machine; and
communicating the user interface to the client machine responsive to the receipt of the automatically generated request, the user interface to include the auction information that is updated based on the network-based marketplace event, the network-based marketplace event associated with an item listed alert, the item listed alert corresponding to a listing of an item identified in a search based on search criteria received from the user.

45. A system to alert a user at a client machine of a network-based marketplace event that is associated with auction information, the system comprising:
a first means for receiving a request for a user interface that includes the auction information, the request automatically generated by a client application program at the client machine; and
a second means for communicating the user interface to the client machine responsive to the receipt of the automatically generated request, the user interface to include the auction information that is updated based on the network-based marketplace event, the network-based marketplace event associated with an item listed alert, the item listed alert corresponding to a listing of an item identified in a search based on search criteria received from the user.

* * * * *

UNITED STATES PATENT AND TRADEMARK OFFICE
CERTIFICATE OF CORRECTION

PATENT NO.         : 8,688,528 B2                                Page 1 of 1
APPLICATION NO.    : 11/027778
DATED              : April 1, 2014
INVENTOR(S)        : Leahy et al.

It is certified that error appears in the above-identified patent and that said Letters Patent is hereby corrected as shown below:

In the Claims

Column 21, line 6, in Claim 15, after "processor;", insert --and--, therefor

Signed and Sealed this
Second Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,688,528 B2  
APPLICATION NO. : 11/027778  
DATED : April 1, 2014  
INVENTOR(S) : Leahy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1765 days.

Signed and Sealed this
Eighth Day of September, 2015

Michelle K. Lee
*Director of the United States Patent and Trademark Office*